(12) United States Patent
Ijuin

(10) Patent No.: US 10,777,783 B2
(45) Date of Patent: Sep. 15, 2020

(54) POWER STORAGE DEVICE PACKAGING MATERIAL AND POWER STORAGE DEVICE USING THE SAME

(71) Applicant: TOPPAN PRINTING CO., LTD., Tokyo (JP)

(72) Inventor: Wataru Ijuin, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 164 days.

(21) Appl. No.: 15/404,448

(22) Filed: Jan. 12, 2017

(65) Prior Publication Data
US 2017/0141362 A1 May 18, 2017

Related U.S. Application Data

(63) Continuation of application No. PCT/JP2015/070178, filed on Jul. 14, 2015.

(30) Foreign Application Priority Data

Jul. 16, 2014 (JP) .................. 2014-145789

(51) Int. Cl.
*H01M 2/02* (2006.01)
*H01G 11/78* (2013.01)
(Continued)

(52) U.S. Cl.
CPC .......... *H01M 2/0287* (2013.01); *H01G 11/78* (2013.01); *H01G 11/82* (2013.01);
(Continued)

(58) Field of Classification Search
None
See application file for complete search history.

(56) References Cited

U.S. PATENT DOCUMENTS 8,920,959 B2 * 12/2014 Suzuta ................ H01M 2/0287
429/141
9,306,196 B2 * 4/2016 Suzuta .................... B32B 15/08
(Continued)

FOREIGN PATENT DOCUMENTS

CN 103098257 A 5/2013
CN 103518272 A 1/2014
(Continued)

OTHER PUBLICATIONS

International Search Report issued in International Patent Application No. PCT/JP2015/070178 dated Sep. 1, 2015.
(Continued)

*Primary Examiner* — Tracy M Dove
(74) *Attorney, Agent, or Firm* — Foley & Lardner LLP

(57) ABSTRACT

A power storage device packaging material including a base material layer; an adhesion-enhancing treatment layer on a surface of the base material layer; an adhesive layer on a surface of the adhesion-enhancing treatment layer opposite the base material layer; a metal foil layer formed on one side of the adhesive layer opposite the adhesion-enhancing treatment layer; and a sealant layer disposed on a surface of the metal foil layer opposite the adhesive layer. The base material layer is formed of a biaxially oriented film to have a breaking strength of 240 MPa or more in at least one of four directions (0° (MD), 45°, 90° (TD), 135°) and an elongation of 80% or more in at least one direction in a tensile test (test specimen shape: test specimen type 5 stipulated in JIS K7127; inter-chuck distance: 60 mm; tensile speed: 50 mm/min).

16 Claims, 4 Drawing Sheets

(51) Int. Cl.
  *H01G 11/82* (2013.01)
  *H01M 2/08* (2006.01)
  *H01G 11/06* (2013.01)
  *H01G 9/08* (2006.01)

(52) U.S. Cl.
  CPC .............. *H01M 2/02* (2013.01); *H01M 2/08* (2013.01); *H01G 9/08* (2013.01); *H01G 11/06* (2013.01); *Y02E 60/13* (2013.01)

(56) References Cited

U.S. PATENT DOCUMENTS

| | | | |
|---|---|---|---|
| 2008/0269366 A1* | 10/2008 | Shaffer | C08L 53/02 521/134 |
| 2009/0104521 A1* | 4/2009 | Yasuda | H01M 2/0417 429/174 |
| 2009/0206096 A1* | 8/2009 | Hirotsu | B21D 51/2638 220/612 |
| 2011/0212361 A1* | 9/2011 | Kim | B32B 27/08 429/176 |
| 2012/0048373 A1* | 3/2012 | Yang | C08F 255/02 136/259 |
| 2013/0149597 A1 | 6/2013 | Suzuta et al. | |
| 2014/0072864 A1 | 3/2014 | Suzuta et al. | |
| 2014/0242333 A1 | 8/2014 | Oono et al. | |
| 2014/0242450 A1 | 8/2014 | Oono et al. | |
| 2015/0232611 A1 | 8/2015 | Manabe et al. | |
| 2016/0204395 A1* | 7/2016 | Oono | H01G 11/78 429/176 |

FOREIGN PATENT DOCUMENTS

| | | |
|---|---|---|
| CN | 103918099 A | 7/2014 |
| EP | 2 709 186 A1 | 3/2014 |
| JP | 2000-123799 A | 4/2000 |
| JP | 2004-327039 A | 11/2004 |
| JP | 2006-192676 A | 7/2006 |
| JP | 2012-203985 A | 10/2012 |
| JP | 2012203985 A * | 10/2012 |
| JP | 2013-006412 A | 1/2013 |
| JP | 2013-101764 A | 5/2013 |
| JP | 2013-107997 A | 6/2013 |
| JP | 2014-007130 A | 1/2014 |
| JP | 2014-022080 A | 2/2014 |
| JP | 2014-078513 A | 5/2014 |
| WO | WO-2012/033133 A1 | 3/2012 |
| WO | WO-2013/069704 A1 | 5/2013 |
| WO | WO-2014/069236 A1 | 5/2014 |
| WO | WO-2015045887 A1 * | 4/2015 .............. H01G 11/78 |

OTHER PUBLICATIONS

Extended European Search Report dated Apr. 26, 2018 in corresponding application No. 15822202.6.
Taiwanese Office Action dated Aug. 29, 2018 in corresponding application No. 104122925.
Chinese Office Action dated Dec. 3, 2018 in corresponding application No. 2015800385793.
JP Office Action issued in the corresponding Japanese Patent Application Ser. No. 2016-534452, dated Jun. 18, 2019.
Chinese Office Action dated Sep. 3, 2019 for corresponding Application No. 201580038579.3 (17 pages).

\* cited by examiner

POWER STORAGE DEVICE PACKAGING MATERIAL AND POWER STORAGE DEVICE USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/070178 filed on Jul. 14, 2015, which is based upon and claims the benefit of priority of Japanese Patent Application No. 2014-145789, filed on Jul. 16, 2014, the entireties of which are hereby incorporated by reference.

TECHNICAL FIELD

The present invention relates to a power storage device packaging material and a power storage device using the same.

BACKGROUND

Known power storage devices include, for example, secondary batteries, such as lithium ion batteries, nickel hydrogen batteries, and lead batteries, and electrochemical capacitors, such as electric double layer capacitors. Due to downsizing of cellular phones or restriction in installation spaces, and the like, power storage devices are further sought to be downsized, and thus attention is being drawn to lithium ion batteries having high energy density. Metal cans that have been used for packaging materials for lithium ion batteries are being replaced by multilayer films due to their light weight, high heat dissipation, and low manufacturing cost.

Such a lithium ion battery using the multilayer film as a packaging material uses a configuration in which battery contents (e.g., positive electrode, separator, negative electrode, electrolyte solution) are covered with a packaging material including an aluminum foil layer to thereby prevent moisture from penetrating into the battery. A lithium ion battery using such a configuration is referred to as an aluminum laminated lithium ion battery.

Examples of such an aluminum laminated lithium ion battery include embossed lithium ion batteries which are well known. In such an embossed lithium ion battery, for example, a recess is formed in part of a packaging material by cold forming to accommodate battery contents therein, and the remaining part of the packaging material is folded, followed by sealing the edge portion by heat sealing (hereinafter may be referred to as "single-sided battery"). In these years, lithium ion batteries have also come to be manufactured for the purpose of enhancing energy density. Such lithium ion batteries are produced by forming a recess on both sides of a packaging material whose surfaces are bonded together to accommodate more battery contents (hereinafter may also referred to as "double-sided batteries"). The double-sided batteries have a problem of difficulty in aligning when bonding the surfaces of the packaging material to each other. However, for a single-sided battery to obtain the energy density equivalent to that of a double-sided battery, a deeper recess is required to be formed.

The energy density of the lithium ion battery can be made higher with a deeper recess formed by cold forming. However, when a deeper recess is formed, pinholes or breakage are more easily caused in forming the packaging material, and thus formability is deteriorated. Therefore, a polyamide film having good formability is used for the base material layer of the packaging material, and the base material layer is bonded to a metal foil via an adhesive layer to protect the metal foil. In this case, the base material layer is required to be in intimate contact with the adhesive layer. As a method of improving the intimate contact of the base material layer with the adhesive layer, there is known a method in which a surface of a base material layer is corona-treated (e.g. see PTLs 1 and 2).

A polyamide film has poor resistance to an electrolyte solution that is a content of the lithium ion battery. When an electrolyte solution unavoidably adheres to the polyamide film in injecting the electrolyte solution during production of the lithium ion battery, the polyamide film will melt and poor appearance may be created. Thus, in a proposed packaging material imparted with electrolyte resistance on a surface of the base material layer, a polyethylene terephthalate (PET) film is further laminated on the outer side of a polyamide film (e.g. see PTL 3).

CITATION LIST

Patent Literature

PTL 1: JP-A-2013-107997
PTL 2: JP-A-2006-192676
PTL 3: JP-A-2004-327039

SUMMARY OF THE INVENTION

Technical Problem

However, in the power storage device packaging material, if a surface of the base material layer is corona-treated as described above, the intimate contact of the base material layer with the adhesive layer is not necessarily sufficient. When the intimate contact of the base material layer with the adhesive layer is insufficient, the base material layer fails to sufficiently protect the adhesive layer and the metal foil, leading to possible breakage of the adhesive layer and the metal foil in deep-drawing the above-mentioned conventional packaging material to form a deep recess.

The present invention has been made in light of the circumstances set forth above, and has an object of providing a power storage device packaging material and a power storage device using the same that can improve the intimate contact of a base material layer with an adhesive layer and can improve the forming depth so as to enable deep drawing without breaking the adhesive layer or the metal foil.

Solution to Problem

In order to achieve the object, the present invention provides a power storage device packaging material including a base material layer, an adhesion-enhancing treatment layer formed on a surface of the base material layer, an adhesive layer formed on a surface on one side of the adhesion-enhancing treatment layer opposite to the base material layer, a metal foil layer formed on a surface on one side of the adhesive layer opposite to the adhesion-enhancing treatment layer, and a sealant layer disposed on a surface on one side of the metal foil layer opposite to the adhesive layer. In the power storage device packaging material, the base material layer is formed of a biaxially oriented film to have a breaking strength of 240 MPa or more in at least one of four directions (0° (MD), 45°, 90° (TD), 135°) and an elongation of 80% or more in at least one direction in a tensile test for a test specimen having a shape given by test specimen 5 in JIS K7127 with an inter-chuck distance of 60 mm and a tensile speed of 50 mm/min.

The power storage device packaging material uses the base material layer satisfying the above conditions for the breaking strength and the elongation, with the adhesion-enhancing treatment layer being intervened between the base material layer and the adhesive layer. Thus, intimate contact of the base material layer with the adhesive layer is improved, and the base material layer sufficiently protects the adhesive layer and the metal foil layer. As a result, the forming depth enabling deep drawing (deep drawing formability) is improved without causing any breakage on the adhesive layer and the metal foil.

In the above power storage device packaging material, it is preferable that the adhesion-enhancing treatment layer contains at least one resin selected from the group consisting of a polyester resin, acrylic resin, polyurethane resin, epoxy resin, and acrylic graft polyester resin. Thus, the intimate contact of the base material layer with the adhesive layer is greatly improved, and deep drawing formability is further improved.

In the power storage device packaging material, the base material layer may have a breaking strength of less than 240 MPa in at least one of the four directions in the tensile test. Thus, the base material layer does not always have a high breaking strength in all the four directions. However, even in such a case as well, the power storage device packaging material of the present invention can improve deep drawing formability, being provided with the adhesion-enhancing treatment layer, and the base material layer with a breaking strength of 240 MPa or more in at least one of the four directions and with an elongation of 80% or more in at least one direction. In other words, the power storage device packaging material of the present invention enables deep drawing even in the case of using a base material layer having anisotropy in the breaking strength thereof, without causing any breakage of the adhesive layer and the metal foil.

In the power storage device packaging material, the base material layer is preferably a biaxially-oriented polyester film or a biaxially-oriented polyamide film. Thus, the protection performance of the base material layer for the adhesive layer and the metal foil layer is further improved, and deep drawing formability is further improved.

The power storage device packaging material may further include a base material protective layer formed on a surface on one side of the base material layer opposite to the adhesion-enhancing treatment layer.

In the power storage device packaging material, the base material layer preferably has a thickness in a range of 6 to 40 µm. Thus, the protection performance of the base material layer for the adhesive layer and the metal foil layer is further improved, and deep drawing formability is further improved.

In the power storage device packaging material, the adhesion-enhancing treatment layer preferably has a thickness in a range of 0.02 to 0.5 µm. Thus, the intimate contact of the base material layer with the adhesive layer is further improved, and deep drawing formability is further improved.

In the power storage device packaging material, the adhesive layer may contain a pigment.

The present invention provides a power storage device including an electrode, a lead extending from the electrode, and a container accommodating the battery element. In the power storage device, the container is formed from the power storage device packaging material of the present invention described above so that the sealant layer is located on an inner side. Since the power storage device uses the above power storage device packaging material of the present invention for the container accommodating the battery element, a deep recess can be formed in the container without causing breakage and the like.

Advantageous Effects of Invention

The present invention provides a power storage device packaging material and a power storage device using the same that can improve intimate contact of a base material layer with an adhesive layer and can improve the forming depth so as to enable deep drawing without breaking the adhesive layer or the metal foil.

DESCRIPTION OF REPRESENTATIVE EMBODIMENTS

Figure 1:
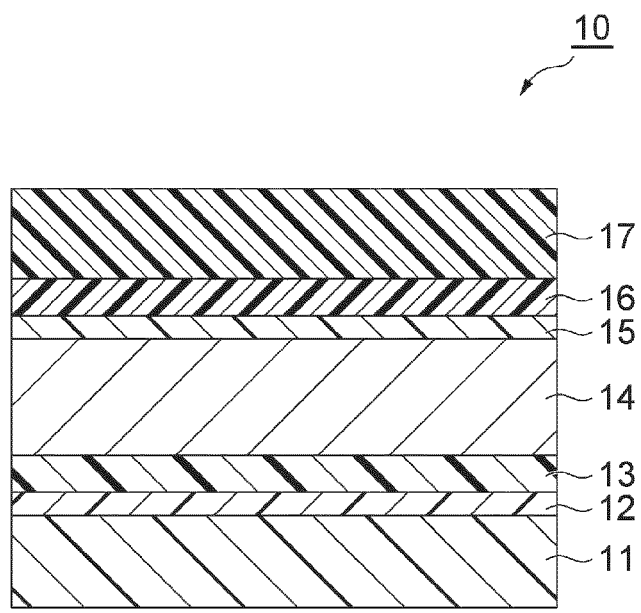
FIG. 1 is a schematic cross-sectional view illustrating a power storage device packaging material, according to an embodiment of the present invention.

Referring to the drawings, hereinafter will be described some preferred embodiments of the present invention in detail. It should be noted that, in the drawings, like reference signs are designated to like components to omit duplicate description.

[Power Storage Device Packaging Material]

FIG. 1 is a cross-sectional view schematically showing an embodiment of a power storage device packaging material according to the present invention. As shown in FIG. 1, a packaging material (power storage device packaging material) 10 of the present embodiment is a laminate with sequential lamination of a base material layer 11, an adhesion-enhancing treatment layer 12 formed (disposed) on a surface of the base material layer 11, an adhesive layer 13 formed (disposed) on a surface on one side of the adhesion-enhancing treatment layer 12 opposite to the surface provided with the base material layer 11, a metal foil layer 14 formed (disposed) on a surface on one side of the adhesive layer 13 opposite to the surface provided with the adhesion-enhancing treatment layer 12, an anticorrosion treatment layer 15 formed (disposed) on a surface on one side of the metal foil layer 14 opposite to the surface provided with the adhesive layer 13, and a sealant layer 17 formed (disposed), via a sealant adhesive layer 16, on a surface on one side of the anticorrosion treatment layer 15 opposite to the surface provided with the metal foil layer 14. In the packaging material 10, the base material layer 11 is the outermost layer, and the sealant layer 17 is the innermost layer. In other words, the packaging material 10 is used such that the base material layer 11 serves as the outer side of the power storage device and the sealant layer 17 serves as the inner side of the power storage device. In the following, these layers will be described.

(Base Material Layer 11)

The base material layer 11 imparts heat resistance to the packaging material 10 in a pressure heat-sealing process, described later, in producing the power storage device, and reduces possible occurrence of pinholes during the process or distribution. The base material layer 11 is formed of a biaxially oriented film. In a tensile test (test specimen shape: test specimen type 5 stipulated in JIS K7127; the inter-chuck distance: 60 mm; tensile speed: 50 mm/min), the base material layer 11 has a breaking strength of 240 MPa or more in at least one of four directions (0° (MD), 45°, 90° (TD), 135°) and an elongation of 80% or more in at least one direction. From the viewpoint of obtaining better deep drawing formability, the base material layer 11 preferably has a breaking strength of 250 MPa or more in at least one of the four directions in the tensile test. Moreover, from the viewpoint of obtaining better deep drawing formability, the base material layer 11 preferably has an elongation of 90% or more in at least one of the four directions in the tensile test. It should be noted that the four directions refer to an extrusion (flow) direction (MD direction) in forming, a direction inclined by 45° relative to the MD direction, a direction vertical to the MD direction (TD direction), and a direction inclined by 135° relative to the MD direction.

The base material layer 11 may have a breaking strength of 240 MPa or more in at least one of the four directions in the tensile test and an elongation of 80% or more in at least one direction. The breaking strength in all the four directions may be 240 MPa or more, and the elongation in all the directions may be 80% or more. Further, the breaking strength in at least one of the four directions may be less than 240 MPa, and the elongation in at least one of the four directions may be less than 80%. If the breaking strength in at least one of the four directions is less than 240 MPa, or if the elongation in at least one of the four directions is less than 80%, the present embodiment can provide the adhesion-enhancing treatment layer, and the base material layer can have a breaking strength of 240 MPa or more in at least one of the four directions and an elongation of 80% or more in at least one direction, thereby improving deep drawing formability.

The breaking strength and the elongation of the base material layer 11 are measurements of the tensile test conducted for the base material layer 11 cut into the test specimen shape (test specimen type 5 stipulated by HS K7127) mentioned above. If it is difficult to measure the base material layer 11 alone, a laminate of the base material layer 11 and the adhesion-enhancing treatment layer 12 may be cut into the test specimen shape for measurements. Since the adhesion-enhancing treatment layer 12 does not influence the values of the breaking strength and the elongation, the obtained measurement results are substantially equivalent to the measurement results in the case of measuring the base material layer 11 alone.

Examples of the biaxially oriented film forming the base material layer 11 include biaxially oriented films, such as a polyester film, polyimide film, polyamide film, polypropylene film, polyethylene film, and the like. Of these films, a biaxially-oriented polyester film or a biaxially-oriented polyamide film is preferable as the base material layer 11, from the viewpoint of obtaining better deep drawing formability.

Examples of the polyester resin forming the biaxially-oriented polyester film include polyethylene terephthalate, polybutylene terephthalate, polyethylene naphthalate, polybutylene naphthalate, copolymerized polyester, polycarbonate, and the like.

Examples of the polyamide resin forming the biaxially-oriented polyamide film include nylon 6, nylon 6,6, a copolymer of nylon 6 and nylon 6,6, nylon 6,10, polymetaxylylene adipamide (MXD6), nylon 11, and nylon 12, and the like. The biaxially-oriented polyamide film is preferably a biaxially-oriented nylon 6 (ONy) film because of the good heat-resisting properties, piercing strength, and impact strength.

Examples of methods of stretching a biaxially oriented film include sequential biaxial stretching, tubular biaxial stretching, simultaneous biaxial stretching, and the like. From the viewpoint of obtaining better deep drawing formability, the biaxially oriented film forming the base material layer 11 is preferably a film stretched by tubular biaxial stretching.

The base material layer 11 preferably has a thickness in a range of 6 to 40 μm, and more preferably 10 to 30 μm. When the base material layer 11 has a thickness of 6 μm or more, anti-pinhole properties and insulating properties of the power storage device packaging material 10 are likely to be improved. On the other hand, when the base material layer 11 has a thickness of 40 μm or less, deep drawing formability of the power storage device packaging material 10 is likely to be further improved.

(Adhesion-Enhancing Treatment Layer 12)

The adhesion-enhancing treatment layer 12 is formed on a surface of the base material layer 11, and disposed between the base material layer 11 and the adhesive layer 13. The adhesion-enhancing treatment layer 12 improves intimate contact of the base material layer 11 with the adhesive layer 13, and further, improves intimate contact of the base material layer 11 with the metal foil layer 14.

The adhesion-enhancing treatment layer 12 preferably includes at least one resin selected from the group consisting of a polyester resin, acrylic resin, polyurethane resin, epoxy resin, and acrylic graft polyester resin. The adhesion-enhancing treatment layer 12 can be formed, for example, by applying a coating agent onto a surface of the base material layer 11. The coating agent contains, as a base resin, at least one resin selected from the group consisting of a polyester resin, acrylic resin, polyurethane resin, epoxy resin, and acrylic graft polyester resin.

<Polyester Resins>

From the viewpoint of adhesion, the polyester resin is preferably a copolymerized polyester having a glass transition temperature reduced by introduction of a copolymerization component. From the viewpoint of coating properties, the copolymerized polyester preferably has water solubility or water dispersibility. A preferably used copolymerized polyester is one bonded with at least one group selected from the group consisting of sulfonic groups or their alkali metal bases (hereinafter referred to as "copolymerized polyester containing a sulfonic group").

The copolymerized polyester containing a sulfonic group refers to a polyester containing a dicarboxylic acid component or glycol component a part of which is bonded with at least one group selected from the group consisting of sulfonic groups or their alkali metal bases. Of these polyesters, copolymerized polyesters are preferably used, which are prepared by using an aromatic dicarboxylic acid component containing at least one group selected from the group consisting of sulfonic groups or their alkali metal bases, at a ratio of 2 to 10 mol % relative to all acid components.

As an example of such dicarboxylic acid, 5-sodium sulfoisophthalic acid is preferable. In this case, other dicarboxylic acid components can include terephthalic acid, isophthalic acid, phthalic acid, p-β-oxyethoxy benzoic acid, 2,6-naphthalene dicarboxylic acid, 4,4'-dicarboxy diphenyl, 4,4'-dicarboxybenzophenone, bis (4-carboxyphenyl) ethane, adipic acid, sebacic acid, cyclohexane-1,4-dicarboxylic acid, and the like.

As the glycol component for producing a copolymerized polyester containing a sulfonic group, ethylene glycol is mainly used. Other members that can be used include propylene glycol, butanediol, neopentyl glycol, diethylene glycol, cyclohexane dimethanol, an ethylene oxide adduct of bisphenol A, polyethylene glycol, polypropylene glycol, polytetramethylene glycol, and the like. Of these members, use of ethylene glycol, propylene glycol, butanediol, neopentyl glycol, diethylene glycol, cyclohexane dimethanol, or the like as a copolymerization component is preferable, from the viewpoint of improving compatibility with sulfonate which is needed in producing a copolymerized polyester containing a sulfonic group, such as polystyrenesulfonate.

Polyester resins that may be used include modified polyester copolymers, such as block copolymers, graft copolymers, and the like, which are modified by polyester, urethane, epoxy, or the like. In the present embodiment, the adhesion-enhancing treatment layer 12 may further contain a resin other than polyester resins to thereby improve the intimate contact between the adhesion-enhancing treatment layer 12, the base material layer 11, and the adhesive layer 13. Examples of such a resin include a urethane resin, acrylic resin, and the like.

<Acrylic Resins>

Examples of a usable monomer component forming an acrylic resin include: alkyl acrylate, alkyl methacrylate (alkyl groups include a methyl group, ethyl group, n-propyl group, isopropyl group, n-butyl group, isobutyl group, t-butyl group, 2-ethyl hexyl group, lauryl group, stearyl group, cyclohexyl group, phenyl group, and benzyl group, phenylethyl group, and the like); hydroxyl group containing monomers, such as 2-hydroxyethyl acrylate, 2-hydroxyethyl methacrylate, 2-hydroxypropylacrylate, and 2-hydroxypropylmethacrylate; amide group containing monomers, such as acrylamide, methacrylamide, N-methylacrylamide, N-methylmethacrylamide, N-methylol acrylamide, N-methylol methacrylamide, N,N-dimethylol acrylamide, N-methoxymethylacrylamide, N-methoxymethylmethacrylamide, and N-phenylacrylamide; amino group containing monomers, such as N,N-diethyl aminoethyl acrylate, and N,N-diethyl aminoethyl methacrylate; epoxy group containing monomers, such as glycidyl acrylate and glycidyl methacrylate; carboxyl groups, such as acrylic acid, methacrylic acid, and salts thereof (lithium salt, sodium salt, potassium salt, and the like) or monomers containing the salts, and the like. These materials may be used singly, or in combination of two or more for copolymerization. Moreover, these materials can be combined with monomers other than ones mentioned above.

Examples of other monomers that can be used include: epoxy group containing monomers, such as allyl glycidyl ether; sulfonic groups, such as styrene sulfonic acid, vinyl sulfonic acid and salts thereof (lithium salt, sodium salt, potassium salt, ammonium salt, and the like), or monomers containing the salts; carboxyl groups, such as crotonic acid, itaconic acid, maleic acid, fumaric acid, and salts thereof (lithium salt, sodium salt, potassium salt, ammonium salt, and the like), or monomers containing the salts; monomers containing acid anhydrides, such as maleic anhydride and anhydrous itaconic acid; vinyl isocyanate, allyl isocyanate, styrene, vinyl methylether, vinyl ethyl ether, vinyl-tris alkoxysilane, alkylmaleic acid monoester, alkylfumaric acid monoester, acrylonitrile, methacrylonitrile, alkyltaconic acid monoester, vinylidene chloride, vinyl acetate, vinyl chloride, and the like. Examples of acrylic resins that may be used include modified acrylic copolymers, such as block copolymers, graft copolymers, and the like, which are modified by polyester, urethane, epoxy, or the like.

The glass transition point (Tg) of an acrylic resin used in the present embodiment is not specifically limited, but is preferably in a range of 0 to 90° C., and more preferably in a range of 10 to 80° C. A low Tg may deteriorate intimate contact at high temperature and high humidity, whereas a high glass transition point may cause cracks in stretching. Thus, from the viewpoint of reducing these drawbacks, Tg of the acrylic resin is preferably in the ranges mentioned above.

The weight average molecular weight of the acrylic resin used in the present embodiment is preferably a 100,000 or more, and more preferably 300,000 or more. A low weight average molecular weight may deteriorate moist heat resistance. In the present embodiment, the adhesion-enhancing treatment layer 12 may further contain a resin other than the acrylic resin to thereby improve the intimate contact between the adhesion-enhancing treatment layer 12, the base material layer 11, and the adhesive layer 13. Examples of such a resin include a polyester resin, urethane resin, and the like.

<Polyurethane Resins>

Polyurethane resins that are preferable include water-based polyurethane resins. From the viewpoint of having a small particle size and good stability, self-emulsifiable resins are preferable as the water-based polyurethane resins. The water-based polyurethane resins may have a particle size of about 10 to 100 nm. The water-based polyurethane resin used in the present embodiment desirably has a glass transition point (Tg) in a range of 40° C. to 150° C. When Tg is 40° C. or more, the occurrence of blocking is likely to be sufficiently reduced in taking up the coated film in a roll. On the other hand, if the drying temperature after coating has an excessively higher Tg than the glass transition point, it is difficult to form a uniform film. Thus, Tg is preferably 150° C. or less.

In the present embodiment, a crosslinker may be used together with the water-based polyurethane resin. A usable crosslinker for a water-based polyurethane includes general-purpose water-soluble crosslinkers, such as a water-soluble epoxy compound. The water-soluble epoxy compound is water-soluble and has two or more epoxy groups. Examples of the water-soluble epoxy compound include: polyepoxy compounds obtained by etherifying one mol of glycols, such as ethylene glycol, diethylene glycol, triethylene glycol, polyethylene glycol, propylene glycol, dipropylene glycol, tripropylene glycol, polypropylene glycol, 1,4-butanediol, 1,6-hexane diol, and neopentyl glycol, with two mols of epichlorohydrin; and diepoxy compounds obtained by esterifying one mol of dicarboxylic acids, such as phthalic acid, terephthalic acid, adipic acid, and oxalic acid with two mols of epichlorohydrin. However, water-soluble epoxy compounds are not limited to these compounds.

These water-soluble crosslinkers are cross-linked with a water-based polyurethane resin to contribute to improving water resistance and solvent resistance of the coating film, and also to improving intimate contact between the adhesion-enhancing treatment layer 12, the base material layer 11, and the adhesive layer 13. In the present embodiment, the water-soluble crosslinker may further contain a resin other than a urethane resin to thereby improve intimate contact between the adhesion-enhancing treatment layer 12, the base material layer 11, and the adhesive layer 13. Examples of such a resin include a polyester resin, acrylic resin, and the like.

The adhesion-enhancing treatment layer 12 may be configured to contain, for example, a resin mentioned above as a base resin, and a curing agent, such as polyfunctional isocyanate, a polyfunctional glycidyl compound, and a melamine compound. In this way, the fact of containing a resin mentioned above as a base resin, and a curing agent, such as polyfunctional isocyanate, a polyfunctional glycidyl compound, and a melamine compound enables use of a cross-linking structure, thereby configuring a strong adhesion-enhancing treatment layer 12.

The coating agent used for forming the adhesion-enhancing treatment layer 12 may be a solvent coating agent or may be a water-based coating agent. A dispersed type (dispersion) coating agent using a water-based base resin is preferable, because it has a high molecular weight and improves inter-molecular cohesion to reduce permeability of alcohol, for example.

The adhesion-enhancing treatment layer 12 preferably has a thickness in a range of 0.02 to 0.5 μm, and more preferably in a range of 0.04 to 0.3 μm. When the thickness of the adhesion-enhancing treatment layer 12 is 0.02 μm or more, a uniform adhesion-enhancing treatment layer 12 is likely to be easily formed, and more sufficient easily-adhesive effect is likely to be obtained. On the other hand, when the thickness of the adhesion-enhancing treatment layer 12 is 0.5 μm or less, deep drawing formability of the packaging material 10 is likely to be further improved.

(Adhesive Layer 13)

The adhesive layer 13 adheres the base material layer 11 to the metal foil layer 14. The adhesive layer 13 is adhered to the base material layer 11 via the adhesion-enhancing treatment layer 12. The adhesive layer 13 has an adhesive force needed to firmly adhere the base material layer 11 to the metal foil layer 14, as well as conformability to prevent the metal foil layer 14 form being broken by the base material layer 11 in cold forming (performance of reliably forming the adhesive layer 13 on a member without separation if the member is deformed, stretched, or contracted).

Examples of an adhesive used for forming the adhesive layer 13 include a two-part curing polyurethane adhesive that contains a base resin formed of polyol, such as polyester polyol, polyether polyol, and acrylic polyol, and a curing agent formed of an aromatic or aliphatic isocyanate. In an adhesive mentioned above, the mol ratio of an isocyanate group of the curing agent to a hydroxyl group of the base resin (═NCO/OH) is preferably in a range of 1 to 10, and more preferably 2 to 5.

After coating the polyurethane adhesive, the packaging material is aged at 40° C. for four days or longer, for example. The aging advances the reaction of the hydroxyl group of the base resin with the isocyanate group of the curing agent, allowing more firm adhesion of the base material layer 11 to the metal foil layer 14.

From the viewpoint of preventing delamination at the deep drawn portion or stretched portion of the packaging material 10 under high temperature conditions (e.g., temperature of 80° C., standing for three days), the adhesive layer 13 preferably contains a proper amount of a filler or pigment, such as of an inorganic substance, for example.

Examples of the pigment that can be used include organic pigments, inorganic pigments, and mixtures of them. When the two-part curing polyurethane adhesive mentioned above is used as the adhesive layer 13, from the viewpoint of intimate contact, a pigment to be added to the adhesive layer 13 preferably includes, for example, a pigment having a functional group that is bonded to an isocyanate group, as a curing agent. Examples of the functional group include a hydroxyl group and the like. Examples of the filler that can be used include an organic filler, inorganic filler, and mixtures of them. The adhesive layer 13 may be colored by containing a color component, such as a pigment and a filler having colorability. In this case, the adhesive layer 13 is preferably colored differently from the color of the metal foil layer 14. When the adhesive layer 13 is colored, the packaging material 10 looks like it is colored overall when viewed from outside. Thus, if a label, printing or the like attached to the outer surface of the base material layer 11 is forged, a genuine product can be distinguished from the forged product on the basis of the difference in color of the packaging material.

The adhesive layer 13 is permitted to contain one or more members selected from the group consisting of the pigments and the fillers mentioned above, with the elasticity modulus of the adhesive layer 13 being adjusted by the pigment or filler, can enhance reliability, such as of high temperature resistance, humidity resistance, and electrolyte resistance, after deep drawing or stretching of the power storage device packaging material 10. The adhesive layer 13 preferably serves to prevent the metal foil layer 14 from being broken in deep drawing or stretching of the packaging material 10.

The pigments mentioned above are not specifically limited as long as they are added in a range not deteriorating adhesion of the adhesive layer 13. Examples of the above-mentioned organic pigments that can be used include azo pigments, phthalocyanine pigments, quinacridone pigments, anthraquinone pigments, dioxazine pigments, indigo pigments, thioindigo pigments, perinone-perylene pigments, isoindolenine pigments, and the like.

Next, specific organic pigments that can be added to the adhesive layer 13 will be described. Examples of organic pigments that can be used to produce a yellow color include isoindolinone, isoindolin, quinophthalone, anthraquinone (flavanthrone), azomethine, xanthene, and the like. Examples of organic pigments that can be used to produce an orange color include diketo pyrrolo pyrrole, perylene, anthraquinone, perinone, quinacridone, and the like. Examples of organic pigments that can be used to produce a red color include anthraquinone, quinacridone, diketo pyrrolo pyrrole, perylene, indigoid, and the like.

Examples of organic pigments that can be used to produce a violet color include oxazine (dioxazine), quinacridone, perylene, indigoid, anthraquinone, xanthene, benzimidazole, viola throne, and the like. Examples of blue organic pigments that can be used to produce a blue color include phthalocyanine, anthraquinone, indigoid, and the like. Examples of organic pigments that can be used to produce a green color include phthalocyanine, perylene, azomethine, and the like.

Examples of the above inorganic pigments that can be used include carbon black pigments, titanium oxide pigments, cadmium pigments, lead pigments, chromium oxide pigments, mica impalpable powder, natural pearl essence, and the like.

Next, specific inorganic pigments that can be added to the adhesive layer 13 will be described. Examples of inorganic pigments that can be used to produce a white color include zinc oxide, white lead, lithopone, titanium dioxide, precipitated barium sulfate, barite powder, and the like.

Examples of inorganic pigments that can be used to produce a red color include minium, red iron oxide, and the like. Examples of inorganic pigments that can be used to produce a yellow color include chrome yellow, zinc yellow (zinc yellow 1, zinc yellow 2), and the like. Examples of inorganic pigments that can be used to produce a blue color include ultramarine blue, Prussian blue (potassium ferric ferrocyanide), and the like. Examples of inorganic pigments that can be used to produce a black color include carbon black and the like.

Examples of the above fillers that can be used and added to the adhesive layer 13 include resin fillers, such as polyethylene, polypropylene, a phenol resin, and acrylic resin, and silica, graphite, and the like. The filler can be in such a shape as a flake-like shape, a spherical shape, a hollow shape, a fiber-like shape, an irregular shape, or the like. When the adhesive layer 13 contains a filler of a high elasticity modulus, reliability of the power storage device packaging material 10 can be improved. Thus, inorganic fillers are preferably used. The adhesive layer 13 may contain one, or two or more pigments and fillers.

If a pigment and/or a filler is added to the adhesive layer 13, the total content of the pigment and the filler in the adhesive layer 13 (100 mass %) is preferably 1 mass % or more, and more preferably 5 mass % or more, from the viewpoint of obtaining much higher reliability. From the viewpoint of obtaining good adhesion, the total content of the pigment and the filler is preferably 50 mass % or less, and more preferably 20 mass % or less.

When coloring the adhesive layer 13, the content of coloring components (a filler having colorability and a pigment) of the adhesive layer 13 (100 mass %) is preferably 0.01 mass % or more, and more preferably 0.5 mass % or more, because forgery prevention performance is improved. From the viewpoint of obtaining good adhesion, the content of the color components is preferably 40 mass % or less, and more preferably 20 mass % or less. These color components may be used in combination with a filler having no colorability.

From the viewpoint of obtaining desired adhesive strength, conformability, processability, and the like, the thickness of the adhesive layer 13 is preferably in a range of 1 to 10 μm, and more preferably 2 to 6 μm.

(Metal Foil Layer 14)

As the metal foil layer 14, various metal foils made of aluminum, stainless steel, and the like can be mentioned. In terms of processability, such as moisture resistance and ductility, as well as cost, the metal foil layer 14 is preferably an aluminum foil. An aluminum foil may be a generally used soft aluminum foil. However, an aluminum foil containing iron is preferable, because of having good anti-pinhole properties and ductility in forming.

In an aluminum foil containing iron (100 mass %), the content of iron is preferably in a range of 0.1 to 9.0 mass %, and more preferably 0.5 to 2.0 mass %. With the iron content being 0.1 mass % or more, a packaging material 10 having better anti-pinhole properties and ductility can be obtained. With the iron content being 9.0 mass % or less, a packaging material 10 having better flexibility can be obtained.

From the viewpoint of imparting desired ductility in forming, an annealed soft aluminum foil (e.g., aluminum foil made of materials 8021 and 8079 of the Japanese Industrial Standards) is more preferable as the aluminum foil.

The aluminum foil used for the metal foil layer 14 is preferably degreased, for example, to obtain a desired electrolyte resistance. To simplify the production process, the aluminum foil preferably has a surface that is not etched. Examples of degreasing that can be used include wet degreasing or dry degreasing. However, from the viewpoint of simplifying the production process, dry degreasing is preferable.

Examples of the dry degreasing include a method of degreasing with which the time of treatment is extended when an aluminum foil is annealed to thereby perform degreasing. Even with the degreasing performed simultaneously with the annealing for making an aluminum foil soft, sufficient electrolyte resistance is obtained.

As the dry degreasing, processes other than the annealing may be used, such as flame treatment or corona treatment. Moreover, the dry degreasing may be one, for example, in which contaminants are oxidatively destroyed and removed using active oxygen generated by applying ultraviolet rays at a specific wavelength to the aluminum foil.

Examples of the wet degreasing that can be used include acid degreasing, alkaline degreasing, and the like. Examples of acids used for the acid degreasing include inorganic acids, such as sulfuric acid, nitric acid, hydrochloric acid, and hydrogen fluoride. These acids may be used singly, or in combination of two or more. Alkaline used for alkaline degreasing, for example, may be sodium hydroxide having high etching effect. Alternatively, alkaline degreasing may be performed using a weak alkaline material or a material formulated with a surface active agent. The wet degreasing mentioned above can be performed by dipping or spraying, for example.

From the viewpoint of barrier properties, anti-pinhole properties, and processability, the thickness of the metal foil layer 14 is preferably in a range of 9 to 200 μm, more preferably 15 to 150 μm, and still more preferably 15 to 100 μm. With the thickness of the metal foil layer 14 being 9 μm or more, the packaging material is not easily broken, if stress is applied in forming. With the thickness of the metal foil layer 14 being 200 μm or less, increase in the mass of the packaging material can be reduced, and lowering of the weight energy density of the power storage device can be minimized.

(Anticorrosion Treatment Layer 15)

The anticorrosion treatment layer 15 serves to reduce corrosion of the metal foil layer 14 caused by hydrogen fluoride generated by the electrolyte solution or by the reaction of the electrolyte solution with moisture. The anticorrosion treatment layer 15 serves to enhance the intimate contact of the metal foil layer 14 with the sealant adhesive layer 16.

The anticorrosion treatment layer 15 is formed, for example, by subjecting a layer serving as the base material of the anticorrosion treatment layer 15 to a treatment of hydrothermal conversion, anodization, or chemical conversion, or anticorrosion treatment in combination with these treatments.

As the above hydrothermal conversion treatment, boehmite treatment can be used, which is achieved, for example, by dipping the metal foil layer 14 in boiled water, to which triethanolamine has been added. As the anodization treatment, for example, alumite treatment can be used. Examples of the chemical conversion treatment that can be used include chromate treatment, zirconium treatment, titanium treatment, vanadium treatment, molybdenum treatment, calcium phosphate treatment, strontium hydroxide treatment, cerium treatment, ruthenium treatment, or treatments using a combination of two or more of these treatments.

The chemical conversion treatment is not limited to wet treatment, but may be a method, for example, in which a treatment agent used for these treatments is mixed with a resin component and the mixture is used for coating. As the anticorrosion treatment, coating-type chromate treatment is preferable from the viewpoint of maximizing the effect of the treatment and of liquid waste disposal.

The anticorrosion treatment layer 15 may be formed by a method other than the anticorrosion treatments mentioned above, e.g. by using a pure coating method. Such a method may use a material, for example, exerting an anticorrosion effect (inhibitor effect) to the metal foil layer 14, and also environmentally preferable material (specifically including a sol of a rare earth element-based oxide (e.g., cerium oxide with a mean particle size of 100 nm or less)). Using such a method, the anticorrosion effect can be imparted to a metal foil, such as an aluminum foil layer, by using a generally used coating method.

The anticorrosion treatment layer 15 may be a single layer or a multilayer. An additive, such as a silane-based coupling agent, may be added to the anticorrosion treatment layer 15. From the viewpoint of anticorrosion and anchoring, the anticorrosion treatment layer 15 preferably has a thickness in a range, for example, of 10 nm to 5 μm, and more preferably 20 to 500 nm.

(Sealant Adhesive Layer 16)

The sealant adhesive layer 16 adheres the metal foil layer 14 formed with the anticorrosion treatment layer 15 to the sealant layer 17. The packaging material 10 is broadly categorized into a thermal laminate configuration and a dry laminate configuration, depending on the adhesive component forming the sealant adhesive layer 16.

The adhesive component forming the sealant adhesive layer 16 having the thermal laminate configuration is preferably an acid-modified polyolefin resin obtained by graft-modifying a polyolefin resin with an acid. The acid-modified polyolefin resin has a polar group introduced to a part of a nonpolar polyolefin resin. Thus, the acid-modified polyolefin resin can be firmly and intimately in contact with both of the sealant layer 17 in the case of its being formed of a nonpolar polyolefin resin film or the like, and the anticorrosion treatment layer 15 which is polarized in many cases. Using the acid-modified polyolefin resin, the resistance of the packaging material 10 to contents, such as an electrolyte solution, is improved, easily preventing lowering of the intimate contact due to deterioration of the sealant adhesive layer 16 if hydrogen fluoride is generated inside the battery.

Examples of polyolefin resins for the acid-modified polyolefin resin include: a low-, medium- or high-density polyethylene; an ethylene-α olefin copolymer; polypropylene; and a propylene-α olefin copolymer. A polyolefin resin when it is a copolymer may be a block copolymer or a random copolymer. The polyolefin resins that can also be used include copolymers obtained by copolymerizing the materials mentioned above with a polar molecule such as of acrylic acid or methacrylic acid, and polymers, such as cross-linked polyolefin. As the acid used for modifying the polyolefin resins, mention can be made of carboxylic acid, epoxy compound, acid anhydride, or the like. The acid is preferably maleic anhydride. Acid-modified polyolefin resins may be used singly or in combination of two or more for the sealant adhesive layer 16.

The sealant adhesive layer 16 having the thermal laminate configuration can be formed by extruding the above adhesive component using an extruder. The sealant adhesive layer 16 having the thermal laminate configuration preferably has a thickness in a range of 2 to 50 μm.

Examples of the adhesive component forming the sealant adhesive layer 16 having the dry laminate configuration include similar adhesives mentioned in the adhesive layer 13. In this case, it is preferable to design the composition of the adhesive using a hardly hydrolyzed base resin so as to provide a composition that can improve crosslink density to thereby reduce swelling due to the electrolytic solution or hydrolysis due to the hydrofluoric acid.

To improve crosslink density, some substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The above dimer fatty acid is obtained by dimerizing various unsaturated fatty acids, and can have a structure, for example, of acyclic type, monocyclic type, polycyclic type, and aromatic ring type.

The fatty acid that is a starting material of the dimer fatty acid is not specifically limited. Further, a dibasic acid as used in a typical polyester polyol may be introduced, with such a dimer fatty acid being contained as an essential component. The curing agent for the base resin forming the sealant adhesive layer 16 may be, for example, an isocyanate compound, which can also be used as a chain extender of a polyester polyol. Thus, the crosslink density of the adhesive coating film is enhanced, leading to the improvement of solubility or swelling, and the increase in the concentration of the urethane group, from which the intimate contact of the base material is expected to be improved.

The sealant adhesive layer 16 having the dry laminate configuration has a bonding part such as of an ester group and a urethane group exerting high hydrolysis. Therefore, for the usage required of much higher reliability, an adhesive component having the thermal laminate configuration is preferably used as the sealant adhesive layer 16.

When the sealant adhesive layer 16 is formed by extrusion forming, the adhesive resin is likely to be oriented in the MD direction (machine direction) due to stress or the like generated in the extrusion forming. In this case, an elastomer may be formulated in the sealant adhesive layer 16 to mitigate the anisotropy of the sealant adhesive layer 16. Examples of the elastomer to be formulated in the sealant adhesive layer 16 include an olefin elastomer, a styrene elastomer, and the like.

The above elastomer preferably has a mean particle size that can improve the compatibility of the elastomer with the adhesive resin and improve the effect of mitigating the anisotropy of the sealant adhesive layer 16. Specifically, the mean particle size of the above elastomer is preferably 200 nm or less, for example.

The mean particle size of the elastomer is determined by, for example, capturing an enlarged image of a cross section of an elastomer composition using an electron microscope, followed by image analysis for the measurement of a mean particle size of dispersed cross-linked rubber components. The elastomers mentioned above may be used singly or in combination of two or more.

When the elastomer is formulated in the sealant adhesive layer 16, the formulation amount of the elastomer added to the sealant adhesive layer 16 (100 mass %) is preferably in a range of 1 to 25 mass %, and more preferably 10 to 20 mass %, for example. With the formulation amount of the elastomer being 1 mass % or more, compatibility with the adhesive resin is likely to be improved, while the effect of mitigating the anisotropy of the sealant adhesive layer 16 is likely to be improved. With the formulation amount of the elastomer being 25 mass % or less, the effect of reducing the swelling of the sealant adhesive layer 16 due to the electrolyte solution is likely to be improved.

The sealant adhesive layer 16 may be, for example, a dispersed adhesive resin solution in which an adhesive resin is dispersed in an organic solvent.

The sealant adhesive layer 16, when it has the thermal laminate configuration, preferably has a thickness in a range of 8 μm or more to 50 μm or less, and more preferably 20 μm or more to 40 μm or less. When the thickness of the sealant adhesive layer 16 is 8 μm or more, a sufficient adhesive strength of the metal foil layer 14 to the sealant layer 17 is easily obtained. When the thickness of the sealant adhesive layer 16 is 50 μm or less, the amount of moisture penetrating from the end surface of the packaging material to the battery elements in the inside can be easily decreased. The sealant adhesive layer 16, when it has the dry laminate configuration, preferably has a thickness in a range of 1 μm or more to 5 μm or less. When the thickness of the sealant adhesive layer 16 is 1 μm or more, a sufficient adhesive strength is easily obtained between the metal foil layer 14 and the sealant layer 17. When the thickness of the sealant adhesive layer 16 is 5 μm or less, the occurrence of cracks in the sealant adhesive layer 16 can be reduced.

(Sealant Layer 17)

The sealant layer 17 imparts sealing properties to the packaging material 10 by heat sealing, and is disposed on the inside of the power storage device in the assemblage and heat-sealed. The sealant layer 17 can be a resin film such as of a polyolefin resin or an acid-modified polyolefin resin obtained by graft-modifying the polyolefin resin with a maleic anhydride or the like. Of these resins, a polyolefin resin is preferable, because it improves the barrier properties against moisture and forms the shape of the power storage device without causing excessive collapse by heat sealing, and thus polypropylene is specifically preferable.

Examples of polyolefin resins include a low-, medium-, or high-density polyethylene; an ethylene-α olefin copolymer; polypropylene; and a propylene-α olefin copolymer. A polyolefin resin when it is a copolymer may be a block copolymer or a random copolymer. These polyolefin resins may be used singly or in combination of two or more.

Some substance may be added to the above types of polypropylenes, including random polypropylene, homo polypropylene, and block polypropylene, the substance being an ethylene-butene copolymer of low crystallizability, propylene-butene copolymer of low crystallizability, terpolymer formed of a three-component copolymer of ethylene, butene, and propylene, anti-blocking agent (AB agent), such as silica, zeolite, and acrylic resin beads, slip agent, such as fatty acid amides, or the like.

The acid-modified polyolefin resin includes, for example, those resins which are similar to ones mentioned in the sealant adhesive layer 16.

The sealant layer 17 may be a monolayer film, or may be a multilayer film, and thus may be selected according to required functions. For example, from the viewpoint of imparting moisture resistance, a multilayer film may be used, in which a resin, such as an ethylene-cyclic olefin copolymer or polymethylpentene, is permitted to intervene between layers.

The sealant layer 17 may contain various additives, such as a fire retardant, slip agent, anti-blocking agent, antioxidant, light stabilizer, tackifier, and the like.

If a heat-sealable film formed by extrusion forming is used as the sealant layer 17, the heat-sealable film is likely to be oriented in the extrusion direction. Therefore, from the viewpoint of mitigating the anisotropy of the sealant layer 17 caused by the orientation, an elastomer may be formulated in the heat-sealable film. Thus, blushing of the sealant layer 17 can be reduced in cold-forming the power storage device packaging material 10 to form a recess.

Examples of the elastomer forming the sealant layer 17 include materials similar to ones exemplified as elastomers forming the sealant adhesive layer 16. When the sealant layer 17 has a multilayer film structure, at least one of the plurality of layers forming the multilayer film structure may be configured to contain an elastomer. For example, if the sealant layer 17 has a three-layer structure formed of a laminate of random polypropylene layer/block polypropylene layer/random polypropylene layer, the elastomer may be formulated only in the block polypropylene layer, or may be formulated only in the random polypropylene layer, or may be blended in both of the random polypropylene layer and the block polypropylene layer.

A slip agent may be contained in the sealant layer 17 to impart slipperiness thereto. In this way, the sealant layer 17 containing the slip agent can prevent needless stretching in portions of the packaging material 10 having a high stretching ratio and serving as a side or a corner of a recess, in forming the recess in the power storage device packaging material 10 by cold forming. This can minimize separation of the metal foil layer 14 from the sealant adhesive layer 16, or occurrence of breakage or blushing in the sealant layer 17 and the sealant adhesive layer 16 due to cracks.

In permitting the sealant layer 17 to contain a slip agent, the content of the slip agent in the sealant layer 17 (100 mass %) is preferably in a range of 0.001 mass % to 0.5 mass %. When the content of the slip agent is 0.001 mass % or more, blushing of the sealant layer 17 in cold forming is likely to be further reduced. When the content of the slip agent is 0.5 mass % or less, lowering of the adhesion strength of a surface of the sealant layer 17 to a surface of another layer in contact therewith is likely to be reduced.

The sealant layer 17 preferably has a thickness in a range of 10 to 100 μm, and more 20 to 60 μm. When the thickness of the sealant layer 17 is 20 μm or more, sufficient heat sealing strength can be obtained, and when 90 μm or less, the amount of penetration of moisture from an end portion of the packaging material can be decreased.

As described above, a preferred embodiment of the power storage device packaging material of the present invention has been described in detail. However, the present invention should not be construed as being limited to such a specific embodiment, but may be variously modified and changed within the range of the spirit of the present invention recited in claims.

For example, although FIG. 1 shows the case in which the anticorrosion treatment layer 15 is formed on the sealant layer 17 side surface of the metal foil layer 14, the anticorrosion treatment layer 15 may be formed on the base material layer 11 side surface of the metal foil layer 14, or may be formed on both surfaces of the metal foil layer 14. The anticorrosion treatment layer 15 does not have to be necessarily formed.

In the power storage device packaging material 10, a base material protective layer described below may be formed on a surface on one side of the base material layer 11 opposite to the adhesion-enhancing treatment layer 12 via an adhesive layer, from the viewpoint of imparting heat resistance to the packaging material 10 in a pressure heat-sealing process, described later, in producing the power storage device, and from the viewpoint of reducing possible occurrence of pinholes during processing or distribution. In particular, when the base material layer 11 is formed of a biaxially-oriented polyamide film, it is preferable to provide the base material protective layer, from the viewpoint of improving the electrolyte resistance. The adhesive layer for adhering the base material layer 11 to the base material protective layer may be those adhesives which are similar to the adhesives mentioned above for forming the adhesive layer 13.

From the viewpoint of forgery prevention or the like, the adhesive layer for adhering the base material layer 11 to the base material protective layer may be colored by the color components mentioned above (a filler having colorability and a pigment). In this case, it is preferable that the adhesive layer is differently colored from the base material layer 11 side color of the laminated part excepting the base material protective layer and the adhesive layer of the packaging material. In other words, the adhesive layer is preferably differently colored from the color of the laminated part when viewed from the base material layer 11 side.

(Base Material Protective Layer)

The base material protective layer is configured to include, for example, a polyester resin, polyamide resin, polyolefin resin, polyimide resin, polycarbonate resin, and the like, and is preferably configured to include a polyester resin.

The base material protective layer may be configured to further include a polyester elastomer or amorphous polyester. The base material protective layer containing a polyester elastomer or amorphous polyester can reduce the elastic area for the tensile stress in forming, and reduce contraction coefficient of the portion stretched in forming, thereby reducing warpage after the forming.

The polyester elastomer includes a hard segment and a soft segment. The hard segment includes crystalline polyester, such as polybutylene terephthalate, polybutylene naphthalate, or polyethylene terephthalate. The hard segment is preferably polybutylene terephthalate. The soft segment includes polyoxyalkylene glycols, such as polytetramethylene glycol, or polyester, such as polycaprolactone or polybutylene adipate. The soft segment is preferably polytetramethylene glycol. The amorphous polyester is obtained, for example, by changing part of ethylene glycol in producing polyester to cyclohexane dimethanol.

It is more preferable that the base material protective layer configured to contain a polyester resin is an oriented polyester film. Because of having good piercing strength or impact strength, a biaxially-oriented polyethylene terephthalate (PET) film is more preferable.

The base material protective layer preferably has a thickness in a range of 4 to 20 μm, and more preferably 10 to 15 μm. With the thickness of the base material protective layer being 20 μm or less, increase is minimized in the contraction coefficient of the portion of the base material protective layer stretched by forming, and the warpage after forming can be reduced. With the thickness of the base material protective layer being 4 μm or more, the effect of protecting the metal foil layer is improved.

Figure 4:
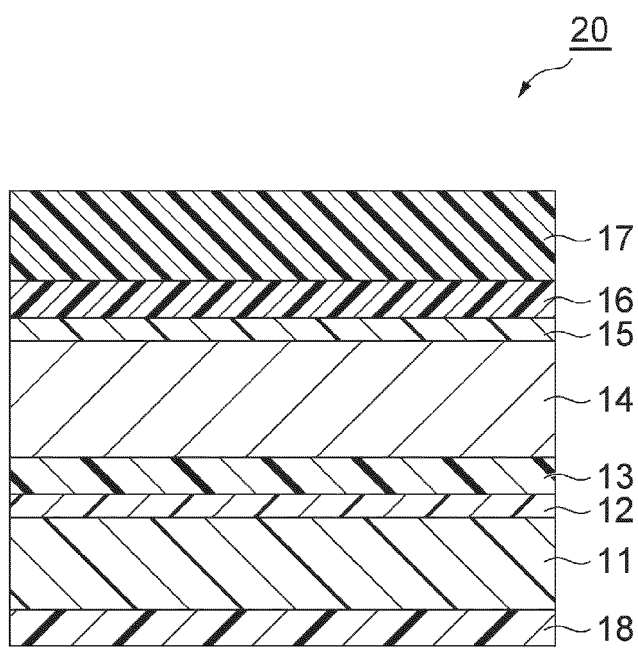
FIG. 4 is a schematic cross-sectional view illustrating a power storage device packaging material, according to another embodiment of the present invention.

The power storage device packaging material may include a base material protective layer formed (disposed) on a surface on one side of the base material layer 11 opposite to the adhesion-enhancing treatment layer 12 without intervention of an adhesive layer. FIG. 4 is a schematic cross-sectional view illustrating a power storage device packaging material according to another embodiment of the present invention. In the above-described power storage device packaging material 10, a power storage device packaging material 20 shown in FIG. 4 further includes a base material protective layer 18 on a surface on one side of the base material layer 11 opposite to the adhesion-enhancing treatment layer 12. In the following, the base material protective layer 18 formed on the base material layer 11 without an intervening adhesive layer will be described.

The base material protective layer 18 is laminated on an outer side surface of the base material layer 11, and preferably contains a urethane resin (hereinafter referred to as "urethane resin (A)") that is formed using at least one member selected from the group consisting of polyester polyol and acrylic polyol having a group that has a hydroxyl group on a side chain (hereinafter, these may be collectively referred to as "polyol (a)"), and an aliphatic isocyanate curing agent. The base material protective layer 18 prevents the base material layer 11 from being deteriorated by the electrolyte solution.

The polyester polyol having a group that has a hydroxyl group on a side chain (hereinafter referred to as "polyester polyol (a1)") has a hydroxyl group also on a side chain, in addition to the hydroxyl group at the end of the repeating unit. Examples of the polyester polyol (a1) include polyester polyol obtained by reacting one or more dibasic acids with one or more compounds each having three or more hydroxyl groups. An unreacted hydroxyl group among the hydroxyl groups of the compounds having three or more hydroxyl groups serves as the hydroxyl group on the side chain of the polyester polyol (a1).

Examples of the dibasic acid include: an aliphatic dibasic acid, such as succinic acid, glutaric acid, adipic acid, pimelic acid, suberic acid, azelaic acid, sebacic acid, or brassylic acid; and an aromatic dibasic acid, such as isophthalic acid, terephthalic acid, or naphthalene dicarboxylic acid.

Examples of the compound having three or more hydroxyl groups include hexanetriol, trimethylol propane, pentaerythritol, and the like.

The polyester polyol (a1) may be a compound obtained by further reaction, as necessary, with a diol, in addition to the reaction between the dibasic acid and the compound having three or more hydroxyl groups.

Examples of the diol include: aliphatic diols, such as ethylene glycol, propylene glycol, butane diol, neopentyl glycol, methylpentane diol, hexane diol, heptane diol, octane diol, nonane diol, decane diol, and dodecane diol; alicyclic diols, such as cyclohexane diol, and hydrogenated xylylene glycol; and aromatic diols, such as xylylene glycol, and the like.

The hydroxyl groups at both ends of the polyester polyol may be reacted with one or more bifunctional or more isocyanate compounds to obtain polyester-urethane polyol with an extended chain and this polyol may be used as the polyester polyol (a1).

As the bifunctional or more isocyanate compound, mention can be made, for example, of 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, isopropylidene dicyclohexyl-4,4'-diisocyanate, and the like. Examples of the bifunctional or more isocyanate compound also include polyester-urethane polyols whose chains have been extended using an adduct form, a biuret form, or an isocyanurate form of these isocyanate compounds.

The acrylic polyol having a group that has a hydroxyl group at the side chain (hereinafter referred to as "acrylic polyol (a2)") has a hydroxyl group at a side chain as well, in addition to the hydroxyl group at an end of the repeating unit. Examples of the acrylic polyol (a2) include a copolymer obtained by copolymerizing at least a hydroxyl group-containing acrylic monomer and a (meth)acrylic acid, and having a repeating unit derived from the (meth)acrylic acid as a main component.

Examples of the hydroxyl group-containing acrylic monomer include 2-hydroxyethyl (meth)acrylate, 2-hydroxypropyl (meth)acrylate, and the like.

The acrylic polyol (a2) may be a copolymer obtained by copolymerizing a hydroxyl group-containing acrylic monomer, (meta)acrylic acid, and a component to be copolymerized with them.

As the component copolymerized with the hydroxyl group-containing acrylic monomer and the (meth)acrylic acid includes, mention can be made of: alkyl (meth)acrylate monomers (alkyl group including a methyl group, ethyl group, n-propyl group, i-propyl group, n-butyl group, i-butyl group, t-butyl group, 2-ethylhexyl group, cyclohexyl group, or the like); amide group-containing monomers, such as (meth)acrylamide, N-alkyl (meth)acrylamide, N,N-dialkyl (meth)acrylamide (alkyl group including a methyl group, ethyl group, n-propyl group, i-propyl group, n-butyl group, i-butyl group, t-butyl group, 2-ethylhexyl group, cyclohexyl group, or the like), N-alkoxy (meth)acrylamide, N,N-dialkoxy (meth)acrylamide (alkoxy group including a methoxy group, ethoxy group, butoxy group, isobutoxy group, or the like), N-methylol (meth)acrylamide, and N-phenyl (meth)acrylamide; glycidyl group-containing monomers such as glycidyl (meth)acrylate, and allyl glycidyl ether; silane-containing monomers, such as (meth) acryloxy propyl trimethoxy silane, and (meth)acryloxy propyl triethoxysilane; and isocyanate group-containing monomers, such as (meth)acryloxy propyl isocyanate.

The polyol (a) is preferably the acrylic polyol (a2) because of having much better electrolyte resistance.

The polyol (a) can be used according to the required function or performance, and may be used singly or in combination of two or more. As a result of using the polyol (a) and the aliphatic isocyanate curing agent, the base material protective layer 18 formed of the urethane resin (A) is obtained.

The aliphatic isocyanate curing agent is a bifunctional or more isocyanate compound having no aromatic ring. The absence of the aromatic ring can prevent the occurrence of quinoidization of a benzene ring due to ultraviolet rays, and reduces yellowing. Thus, the aliphatic isocyanate curing agent is suitable for the outermost layer. The aliphatic isocyanate curing agent includes methylene diisocyanate, isopropylene diisocyanate, lysine diisocyanate, 2,2,4- or 2,4,4-trimethyl hexamethylene diisocyanate, 1,6-hexamethylene diisocyanate, methyl cyclohexane diisocyanate, isophorone diisocyanate, 4,4'-dicyclohexylmethane diisocyanate, isopropylidene dicyclohexyl-4,4'-diisocyanate, and the like. An adduct form, a biuret form, or an isocyanurate form of these isocyanate compounds may be used.

As the aliphatic isocyanate curing agent, 1,6-hexamethylene diisocyanate or isophorone diisocyanate is preferable, because improvement is obtained in electrolytic solution resistance. In the reactivity between the aliphatic isocyanate curing agent and the hydroxyl group of the polyol (a), the reactivity between the 1,6-hexamethylene diisocyanate and the hydroxyl group of the polyol (a) is higher than the reactivity between the isophorone diisocyanate and the hydroxyl group of the polyol (a). Thus, from the viewpoint of mass productivity as well as good self-repairability to be exerted by curing agents, 1,6-hexamethylene diisocyanate is specifically preferable.

A mol ratio (NCO/OH) of the isocyanate group of the aliphatic isocyanate curing agent to the hydroxyl group of the polyol (a) in the urethane resin (A) is preferably in a range of 0.5 to 50, and more preferably 1 to 20. When the mol ratio (NCO/OH) is not less than the lower limit (0.5), scratch resistance and electrolyte resistance are improved. When the mol ratio (NCO/OH) is not more than the upper limit (50), the intimate contact with the base material layer 11 is easily ensured.

The glass transition temperature Tg of the urethane resin (A) is preferably 0° C. or more, and more preferably 5° C. or more because scratch resistance is improved by self-repairability in this temperature range. The glass transition temperature Tg of the urethane resin (A) is preferably 60° C. or less, more preferably 40° C. or less, and still more preferably 20° C. or less because the base material protective layer 18 is easily prevented from becoming fragile as a result of being cured in this temperature range. It should be noted that the glass transition temperature Tg of the urethane resin (A) refers to a peak temperature (rate of temperature rise 5° C./min) of the loss tangent (tan θ) at 1 hertz in dynamic viscoelastic measurement (DMS).

The base material protective layer 18 preferably has a thickness in a range of 1 to 10 μm, and more preferably in a range of 1 to 5 μm. When the thickness of the base material protective layer 18 is not less than the lower limit (1 μm), good electrolyte resistance and scratch resistance are easily obtained. When the thickness of the base material protective layer 18 is not more than the upper limit (10 μm), the thickness of the base material is easily reduced, and stretchability is easily obtained.

The base material protective layer 18 preferably contains a filler. When a filler is contained, if the surface of the base material protective layer 18 is scratched, the scratches become less noticeable. Further, with a filler being contained in the base material protective layer 18, good blocking (adhesion) resistance can be obtained.

Examples of the filler include resin fillers, such as polyethylene, polypropylene, phenolic resin, and acrylic resin, and silica, graphite and the like. The shape of the filler includes a flake-like shape, a spherical shape, a hollow shape, a fiber-like shape, an irregular shape, or the like. Of these fillers, a resin filler is preferable, and an irregular resin filler is more preferable, from the viewpoint of improving scratch resistance in the base material protective layer 18.

From the viewpoint of easily reducing surface luster, the content of the filler in the base material protective layer 18 (100 mass %) is preferably 1 mass % or more, and more preferably 3 mass % or more. Further, from the viewpoint of easily preventing detachment of the filler, the content of the filler is preferably 50 mass % or less, and more preferably 30 mass % or less.

From the viewpoint of further reducing luster, the mean particle size of the filler is preferably 0.8 µm or more, and more preferably 1.0 µm or more. It should be noted that the mean particle size of the filler refers to a value measured by laser diffractometry.

Besides the fillers mentioned above, additives may be formulated into the base material protective layer 18, the additives including a fire retardant, lubricant, antioxidant, light stabilizer, tackifier, leveling agent, antifoamer, and the like. Examples of the lubricant include fatty amides, such as oleic acid amide, erucic acid amide, stearic acid amide, behenic acid amide, ethylene bis-oleic acid amide, and ethylene bis-erucic acid amide. These additives may be used singly or in combination of two or more.

The outer surface of the base material protective layer 18 is preferably subjected to matte treatment. Thus, slipperiness in the surface of the base material protective layer 18 is improved to easily prevent the packaging material 20 from being brought into excessively intimate contact with a mold in cold forming, thereby improving formability. In addition, a matte effect is also obtained.

The base material protective layer 18 may be colored by the color components (a filler having colorability and a pigment) mentioned above. In this case, the base material protective layer 18 is preferably colored differently from the base material layer 11 side color of the laminated part (hereinafter referred to as "laminated part A") except the base material protective layer 18 of the packaging material 20. In other words, the base material protective layer 18 is preferably colored differently from the laminated part A as viewed from the base material layer 11 side. For example, it is preferable that, if the base material layer 11, the adhesion-enhancing treatment layer 12, and the adhesive layer 13 are colorless and transparent, the base material layer 11 side color of the laminated part A is the color of the metal foil layer 14, and the base material protective layer 18 is colored differently from the color of the metal foil layer 14. It is preferable that, if the base material layer 11, the adhesion-enhancing treatment layer 12, and the adhesive layer 13 are transparent and colored, the laminated part A, including the color of the base material layer 11, the adhesion-enhancing treatment layer 12, and the adhesive layer 13, is colored differently from the color as viewed from the base material layer 11 side.

It should be noted that the color different from the base material layer 11 side color of the laminated part A refers to a color that can be distinguished from the base material layer 11 side color of the laminated part A by an optical method. Examples of the optical method include a method using a spectrophotometer, a method of detecting a color difference on the basis of the difference in shade resulting from processing an image captured using a laser or CCD, and the like. In the present specification, the term "transparent" refers to that the visible light transmittance, i.e. the ratio of transmitted light to the entire light quantity in the visible light range (380 to 700 nm), is 10% or more.

The base material protective layer 18 is colored as described above. Thus, in producing the packaging material 20, the defects are easily detected (detection of defects is improved) in forming the base material protective layer 18. In other words, since the base material protective layer 18 is differently colored from the base material layer 11 side color of the laminated part A, the base material layer 11 side color of the laminated part A is exposed from only the defect portions of the base material protective layer 18 in the occurrence of defects, such as unfinished coating and fish eyes, in forming the base material protective layer 18. This enables color distinction between defective portions of the base material protective layer 18 and other portions by use of an optical method or the like, allowing easy detection of defects. Accordingly, packaging materials with defects, such as unfinished coating and fish eyes, caused in forming the base material protective layer 18 are prevented from being included in products, improving the quality of the packaging material 20 obtained.

The color components used for coloring the base material protective layer 18 are not specifically limited as far as the color components can color the base material protective layer 18 differently from the base material layer 11 side color of the laminated part A, to an extent not impairing the electrolyte resistance of the base material protective layer 18. The color components that can be used are ones similar to those which are mentioned in the description of the adhesive layer 13. From the viewpoint of intimate contact with a urethane resin formed of the above polyol and the curing agent in the base material protective layer 18, it is preferable to use color components having a functional group that is bonded to the above isocyanate group of the curing agent.

One, or two or more color components may be contained in the base material protective layer 18. The color of the base material protective layer 18 may be selected according to the base material layer 11 side color of the laminated part A.

To easily detect defects (to obtain good defect detectability), the content of the color component in the base material protective layer 18 (100 mass %) is preferably 0.01 mass % or more, and more preferably 0.5 mass % or more. From the viewpoint of obtaining good electrolyte resistance, the content of the color component is preferably 80 mass % or less, and more preferably 50 mass % or less. From the viewpoint of intimate contact with the base material layer 11, the total content of the color component and the filler is preferably 40 mass % or less, and more preferably 20 mass % or less.

[Method of Producing the Packaging Material]

Next, a method of producing the packaging material 10 will be described. It should be noted that the method of producing the packaging material 10 is not limited to the method below.

Examples of the method of producing the packaging material 10 include a method including the following steps S11 to S14.

Step S11: Step of forming the anticorrosion treatment layer 15 on a surface of the metal foil layer 14.

Step S12: Step of forming the adhesion-enhancing treatment layer 12 on a surface of the base material layer 11 to obtain a laminate.

Step S13: Step of bonding the other surface of the metal foil layer 14 (the surface opposite to the surface where the anticorrosion treatment layer 15 is formed) to the adhesion-enhancing treatment layer 12 side surface of the laminate via the adhesive layer 13.

Step S14: Step of forming the sealant layer 17 on the anticorrosion treatment layer 15 via the sealant adhesive layer 16.

(Step S11)

In step S11, the anticorrosion treatment layer 15 is formed on a surface of the metal foil layer 14. Specifically, for example, an anticorrosion agent (parent material of the anticorrosion treatment layer 15) is coated to a surface of the metal foil layer 14, sequentially followed by drying, curing, and baking, thereby forming the anticorrosion treatment layer 15. The anticorrosion agent may, for example, be an anticorrosion agent for coating-type chromate treatment, or the like. The coating method of the anticorrosion agent is not specifically limited. However, for example, gravure coating, gravure reverse coating, roll coating, reverse roll coating, die coating, bar coating, kiss coating, comma coating, and the like can be used. The metal foil layer 14 may be an unprocessed metal foil layer, or may be a metal foil layer degreased by wet degreasing or dry degreasing.

(Step S12)

In step S12, the adhesion-enhancing treatment layer 12 is formed on a surface of the base material layer 11. Herein, inline coating will be described as an example of a method of forming the adhesion-enhancing treatment layer 12. First, a dispersion-containing coating solution is prepared by dispersing the above resin for serving as the principal component of the adhesion-enhancing treatment layer 12 into water by use of a dispersant. Subsequently, the water-based coating solution is coated onto a surface of a thermoplastic resin film before completion of crystal orientation (parent material of the base material layer 11). Subsequently, the coated water-based coating solution is dried, and then the thermoplastic resin film is stretched in at least a uniaxial direction.

Subsequently, the thermoplastic resin film is heat-treated to complete the orientation, thereby obtaining a laminate in which the adhesion-enhancing treatment layer 12 is formed on a surface of the base material layer 11. By forming the adhesion-enhancing treatment layer 12 using such inline coating, intimate contact of the base material layer 11 with the adhesion-enhancing treatment layer 12 is improved. The method of forming the adhesion-enhancing treatment layer 12 is not limited to the above method, but any method may be used. The timing of forming the adhesion-enhancing treatment layer 12 is not limited to that of the embodiment.

(Step S13)

In step S13, the other surface of the metal foil layer 14 (the surface opposite to the surface where the anticorrosion treatment layer 15 is formed) is bonded to the adhesion-enhancing treatment layer 12 side surface of the laminate using an adhesive for forming the adhesive layer 13 by means of a dry lamination method or the like. In step S13, aging treatment may be performed at a temperature in a range of room temperature to 100° C. to promote adhesion. The period of aging is 1 to 10 days, for example.

(Step S14)

Following step S13, the sealant layer 17 is formed, via the sealant adhesive layer 16, on the anticorrosion treatment layer 15 of the laminate in which the base material layer 11, the adhesion-enhancing treatment layer 12, the adhesive layer 13, the metal foil layer 14, and the anticorrosion treatment layer 15 are laminated in this order. The sealant layer 17 may be laminated by such a method as dry lamination or sandwich lamination, or may be laminated by co-extrusion together with the sealant adhesive layer 16. From the viewpoint of improving adhesion, the sealant layer 17 is preferably laminated by sandwich lamination, or laminated by co-extrusion together with the sealant adhesive layer 16, for example, and more preferably laminated by sandwich lamination.

The packaging material 10 is obtained through steps S11 to S14 described above. It should be noted that the order of steps in the method of producing the packaging material 10 is not limited to the method of sequentially performing steps S11 to S14. The order of performing steps may be appropriately changed, e.g. step S12 may be followed by step S11.

When producing the packaging material 20, step S15 below is further performed in addition to steps S11 to S14.

Step S15: Step of forming the base material protective layer 18 on the surface on one side of the base material layer 11 opposite to the adhesion-enhancing treatment layer 12.

(Step S15)

In step S15, the base material protective layer 18 is formed (laminated) on the outer side surface of the base material layer 11 (the surface opposite to the adhesion-enhancing treatment layer 12). The method of laminating the base material protective layer 18 may include, for example, preparing a dispersion-type coating solution of a urethane resin for forming the base material protective layer 18, coating the prepared solution by several coating methods, such as dipping and spraying, and then braking the coated solution by heating to volatilize the solvent. The base material protective layer 18 can also be formed by a method such as of extrusion forming of melting and extruding the urethane resin. The outer surface of the base material protective layer 18 may be subjected to matte treatment or the like.

The order of steps in a method of producing the packaging material 20 is not limited to the method sequentially performing steps S11 to S15. The order of performing steps may be appropriately changed, e.g., step S15 may be followed by step S11.

[Power Storage Device]

Next, a power storage device provided with the packaging material 10 as a container will be described. The power storage device includes a battery element 1 including an electrode, leads 2 extending from the electrode, and a container accommodating the battery element 1. The container is formed from the power storage device packaging material 10 so that the sealant layer 17 is located on the inner side. The container may be obtained by a method of overlapping two packaging materials with each other with their sealant layers 17 being located face-to-face, and heat-sealing the peripheral portion of the packaging materials 10 overlapped with each other. Alternatively, the container may be obtained by a method of folding one packaging material to overlap the surfaces with each other, and similarly heat-sealing the peripheral portion of the packaging material 10. Examples of the power storage device include secondary batteries, such as a lithium ion battery, nickel hydrogen battery, and lead battery, and electrochemical capacitors, such as an electric double layer capacitor. In the power storage device, the packaging material 20 may be used instead of the packaging material 10.

The leads 2 are sandwiched and hermetically sealed by the packaging material 10 forming the container, with the sealant layer 17 being located on the inner side. The leads 2 may be sandwiched by the packaging material 10 via a tab sealant.

[Method of Producing the Power Storage Device]

Figure 2A:
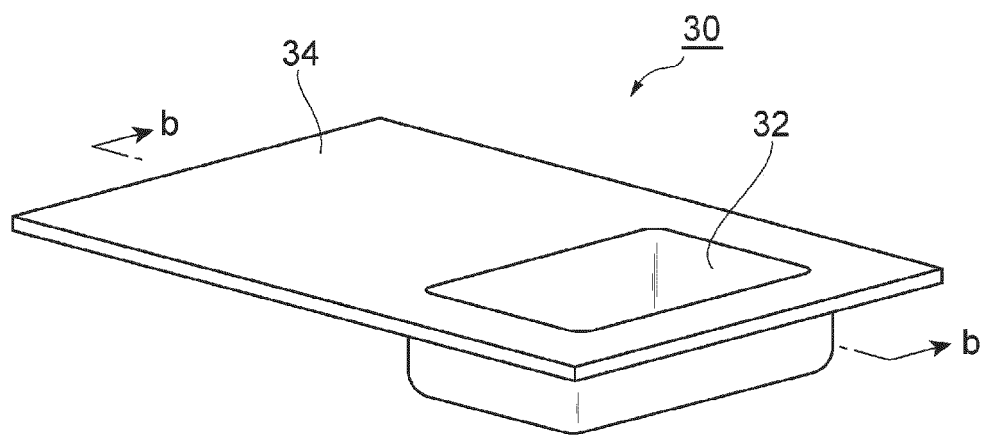
FIGS. 2A and 2B are a set of diagrams illustrating an embossed packaging material obtained using the power storage device packaging material according to an embodiment of the present invention, with FIG. 2A being a perspective view of the embossed packaging material, and FIG. 2B being a vertical cross-sectional view of the embossed packaging material shown in FIG. 2A taken along the line b-b.
Figure 2B:
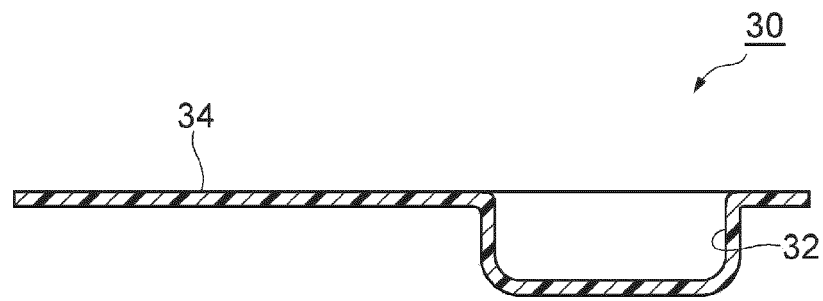

Next, a method of producing a power storage device using the above-described packaging material 10 will be described. The packaging material 20 may be used instead of the packaging material 10. Description herein is provided by way of an example in which a secondary battery 40 is produced using an embossed packaging material 30. FIGS. 2A and 2B show a set of diagrams illustrating the embossed packaging material 30. FIGS. 3A-3D show a set of perspective views illustrating the production process of a single-sided battery using a packaging material 10. The secondary battery 40 may be a double-sided battery produced by a method of preparing two packaging materials like the embossed packaging material 30, and bonding the two packaging materials to each other by adjusting the alignment of the packaging materials.

The secondary battery 40, which is a single-sided battery, can be produced through steps S21 to S25 below, for example.

Step S21: Step of preparing the packaging material 10, the battery element 1 including the electrode, and the leads 2 extending from the electrode.

Step S22: Step of forming a recess 32 for disposing the battery element 1 therein on a surface of the packaging material 10 (see FIG. 3A and FIG. 3B).

Figure 3A:
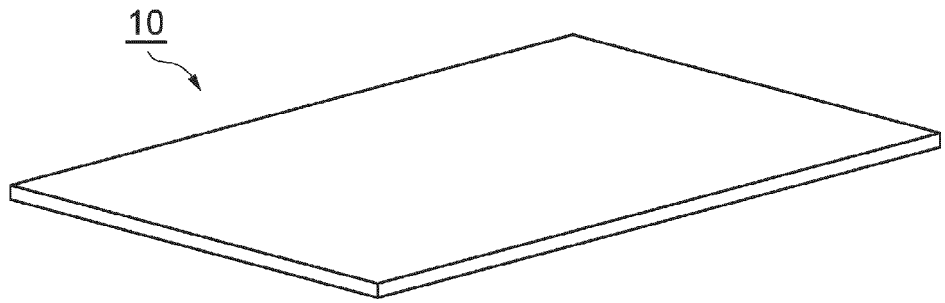
FIGS. 3A-3D are a set of perspective views illustrating a process of producing a secondary battery using the power storage device packaging material according to an embodiment of the present invention, with FIG. 3A showing the power storage device packaging material, FIG. 3B showing the power storage device packaging material that has been embossed, and a battery element, FIG. 3C showing the power storage device packaging material that has been folded with an end portion being heat-sealed, and FIG. 3D showing a state in which both sides of the turned-up portion have been turned up.
Figure 3B:
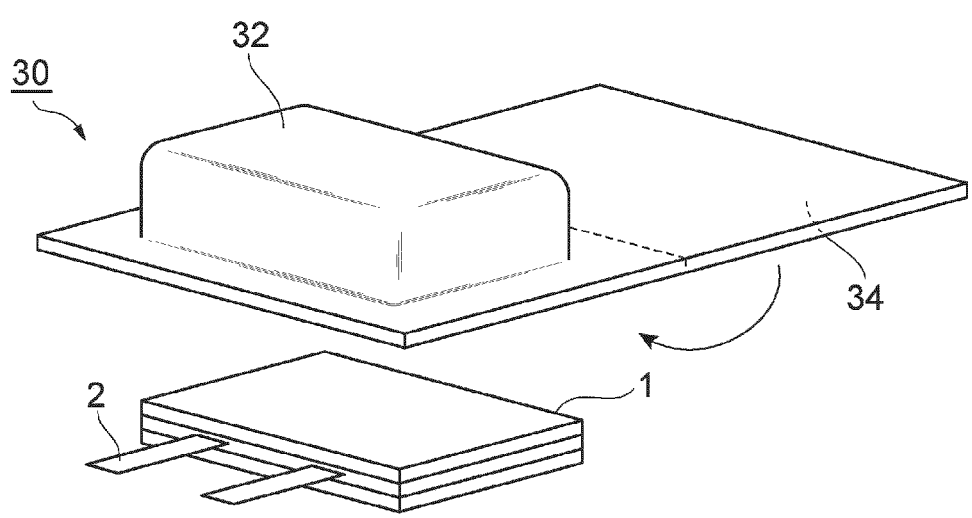
Figure 3C:
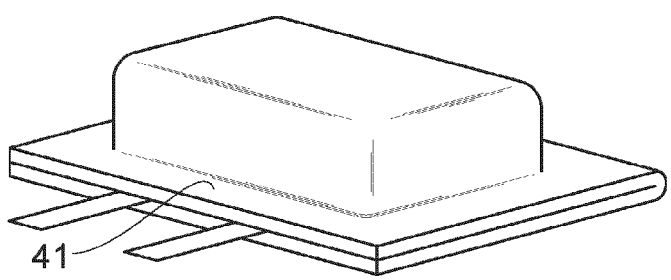
Figure 3D:
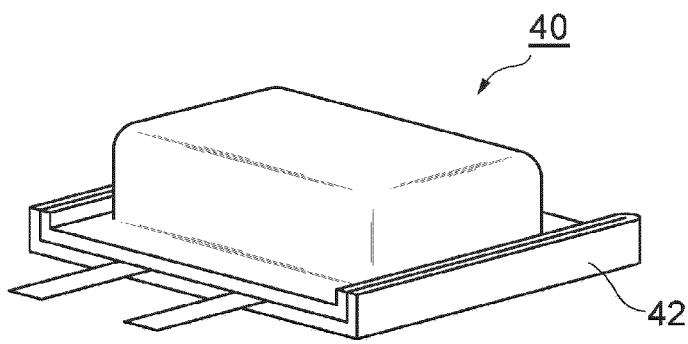

Step S23: Step of disposing the battery element 1 in a shaped area (recess 32) of the embossed packaging material 30, folding the embossed packaging material 30, with the surfaces being overlapped, so as to cover the recess 32 with a cover portion 34, and pressure heat-sealing one side of the embossed packaging material 30 so as to sandwich the leads 2 extending from the battery element 1 (FIG. 3B and FIG. 3C).

Step S24: Step of pressure heat-sealing another side while leaving the side other than the side sandwiching the leads 2 unsealed, injecting an electrolyte solution from the unsealed side, and pressure heat-sealing the unsealed side in a vacuum (see FIG. 3C).

Step S25: Step of trimming the end portions of the sides subjected to pressure heat-sealing except for the side sandwiching the leads 2, and bending the end portions toward the shaped area (recess 32) side (see FIG. 3D).

(Step S21)

In step S21, the packaging material 10, the battery element 1 including the electrode, and the leads 2 extending from the electrode are prepared. The packaging material 10 is prepared based on the above-described embodiment. The battery element 1 and the leads 2 are not specifically limited, but well-known battery element 1 and leads 2 may be used.

(Step S22)

In step S22, the recess 32, in which the battery element 1 is to be disposed, is formed on the sealant layer 17 side of the packaging material 10. The recess 32 in plan view is in a shape in conformity with the shape of the battery element 1, e.g., a rectangular shape in plan view. The recess 32 is formed by pressing a pressing member having a rectangular pressing surface, for example, against a part of the packaging material 10 in the thickness direction. The position, to which a pressure is applied, i.e. the recess 32, is formed being deviated to an end portion of the packaging material 10 in the longitudinal direction, relative to the center area of the packaging material 10 that has been cut into a rectangular shape. Thus, after forming, another end portion side, in which the recess 32 is not formed, can be folded over to serve as the cover (cover portion 34).

More specifically, the method of forming the recess 32 includes a method of forming by means of a mold (deep drawing). The molding method uses a female mold and a male mold which are disposed with a gap therebetween of not less than the thickness of the packaging material 10 to push the male mold into the female mold together with the packaging material 10. The amount of push of the male mold is controlled to control the depth of the recess 32 (amount of deep drawing) as desired. The embossed packaging material 30 is obtained by forming the recess 32 in the packaging material 10. The embossed packaging material 30 has a shape shown in FIGS. 2A and 2B, for example. FIG. 2A is a perspective view of the embossed packaging material 30. FIG. 2B is a vertical cross-sectional view taken along the line b-b of the embossed packaging material 30 shown in FIG. 2A.

(Step S23)

In step S23, the battery element 1 formed of a positive electrode, a separator, a negative electrode, and the like is disposed in the shaped area (recess 32) of the embossed packaging material 30. The leads 2 extending from the battery element 1 and bonded to the respective positive and negative electrodes are drawn out of the shaped area (recess 32). Then, the embossed packaging material 30 is folded along a line at substantially the center in the longitudinal direction to overlap the surfaces, with the sealant layers 17 being located on the inner side, and then one side of the embossed packaging material 30 sandwiching the leads 2 is pressure heat-sealed. Pressure heat-sealing is controlled by three conditions, temperature, pressure, and time, which are appropriately set. The temperature in pressure heat-sealing is preferably not less than the temperature of melting the sealant layer 17.

The thickness of the sealant layer 17 before being heat-sealed is preferably in a range of 40% or more to 80% or less relative to the thickness of the leads 2. With the thickness of the sealant layer 17 being not less than the lower limit, a heat-sealing resin is likely to sufficiently fill the end portions of the leads 2. With the thickness of the sealant layer 17 being not more than the upper limit, the thickness of the end portion of the packaging material 10 of the secondary battery 40 can have a moderate thickness, reducing the amount of moisture penetrating from the end portions of the packaging material 10.

(Step S24)

In step S24, another side is pressure heat-sealed, leaving the side other than the side sandwiching the leads 2 unsealed. After that, an electrolyte solution is injected from the unsealed side, and the unsealed side is pressure heat-sealed in a vacuum. The conditions for pressure heat-sealing are similar to those in step S23.

(Step S25)

The pressure heat-sealed end sides of the perimeter other than the side sandwiching the leads 2 are trimmed, and the sealant layer 17 that has run off the end portions is removed. Then, the pressure heat-sealed end portions of the perimeter are turned up toward the shaped area 32 to form turned-up portions 42, thereby obtaining the secondary battery 40.

Preferred embodiments of the method of producing the power storage device packaging material and the method of producing the power storage device of the present invention have so far been described in detail. However, the present invention should not be construed as being limited to these specific embodiments, but may be variously modified and changed within the range of the spirit of the present invention recited in the claims.

EXAMPLES

In the following, the present invention will be described in more detail based on examples. However, the present invention should not be limited to the following examples.

(Preparation of a Coating Agent for Forming the Adhesion-Enhancing Treatment Layer)

As a coating agent for forming the adhesion-enhancing treatment layer, coating agents A to D having compositions below were prepared.

Coating agent A: To a water-soluble polyester "Aron Melt PES-1000" manufactured by Toagosei Co., Ltd., a self-emulsifiable polyisocyanate "Aquanate 100" manufactured by Nippon Polyurethane Industry Co., Ltd. and spherical silica fine particles "Seahostar KE-P30" (mean particle size of 0.3 μm) manufactured by Nippon Shokubai Co., Ltd.

were added at a formulation ratio (mass ratio) of 95/5/0.5, followed by dilution with water.

Coating agent B: To a water-soluble methacrylic acid methylcopolymer "Rikabondo SA-R615A" (Tg of 67° C.) manufactured by Chirika. Co-anchor., Ltd., a water-soluble polyepoxy compound "Denacol EX-521" (polyglycerol polyglycidyl ether) manufactured by Nagase ChemteX Corporation, and sphere silica fine particles "Seahostar KE-P30" (mean particle size of 0.3 μm) manufactured by Nippon Shokubai Co., Ltd. were added at a formulation ratio (mass ratio) of 75/25/0.5, followed by dilution with water.

Coating agent C: To a self-emulsifiable polyurethane resin "Takelac W-0610" manufactured by Takeda Pharmaceutical Company Limited., a water-soluble polyepoxy compound "Denacol EX-521" (polyglycerol polyglycidyl ether) manufactured by Nagase ChemteX Corporation, "Surfynol 440" manufactured by Nisshin Chemical Co., Ltd. and colloidal silica "Snowtex ST-C" (mean particle size in a range of 10 to 20 nm) manufactured by Nissan Chemical Industries. Ltd. were added at a formulation ratio (mass ratio) of 70/30/0.05/5, followed by dilution with water.

Coating agent D: An acid-modified polyolefin resin dispersion LX4110 manufactured by Sumitomo Chemical Co-Anchor., Ltd., a polyvinyl alcohol aqueous solution, VC10 manufactured by Japan Van & Oval Co., Ltd. and Adeka Resin EM-051R manufactured by Adeka Corp. were mixed so that the solid content of VC10 was 80 parts by mass and the solid content of EM-051R were 8 parts by mass relative to the solid content of 100 parts by mass of the acid-modified polyolefin resin.

Example 1

In Example 1, a power storage device packaging material 10 was prepared by the following method. First, a soft aluminum foil material 8079 (manufactured by TOYO ALUMINIUM K.K.) with a thickness of 40 μm was prepared as a metal foil layer 14. Subsequently, sodium polyphosphate-stabilized cerium oxide sol (anticorrosion agent), in which distilled water was used as a solvent and the solid content concentration was adjusted to 10 mass %, was coated onto a surface of the metal foil layer 14 by gravure coating. In this case, phosphoric acid was 10 parts by mass relative to 100 parts by mass of ceric oxide.

Subsequently, the coated sodium polyphosphate-stabilized cerium oxide sol was dried, followed by baking, thereby forming an anticorrosion treatment layer 15. In this case, for the baking conditions, the temperature was 150° C., and processing time was 30 seconds.

Subsequently, a laminate (hereinafter referred to as "laminate P1") was prepared, in which an adhesion-enhancing treatment layer 12 was formed on a surface of a base material layer 11. The base material layer 11 used was a nylon 6 film with a thickness of 25 μm fabricated by sequential biaxial stretching. The adhesion-enhancing treatment layer 12 was formed by inline coating in which the coating agent A to serve as the base material of an adhesion-enhancing treatment layer 12 was coated onto a surface of the base material layer 11 so as to have a solid content of 0.1 g/m², followed by drying, thereby forming the adhesion-enhancing treatment layer 12 with a thickness of about 0.1 μm.

Subsequently, a polyurethane adhesive (trade name A525/A50, manufactured by Mitsui Chemicals, Inc.), as an adhesive layer 13, was coated onto the other surface of the metal foil layer 14 (surface opposite to the surface where the anticorrosion treatment layer 15 was formed). Subsequently, the metal foil layer 14 was adhered to the adhesion-enhancing treatment layer 12 side surface of the laminate P1 via the adhesive layer 13 by dry lamination. Then, the structure formed of the base material layer 11, the adhesion-enhancing treatment layer 12, the adhesive layer 13, the metal foil layer 14, and the anticorrosion treatment layer 15 was left for six days in an atmosphere at a temperature of 60° C. for aging.

Subsequently, a sealant adhesive layer 16 was formed on the surface on one side of the anticorrosion treatment layer 15 opposite to the metal foil layer 14. In this case, the sealant adhesive layer 16 was formed by extruding maleic anhydride-modified polypropylene (trade name ADMER, manufactured by Mitsui Chemicals, Inc.) to serve as the base material of the sealant adhesive layer 16. In this case, the thickness of the sealant adhesive layer 16 was 20 μm. Subsequently, a polyolefin film with a thickness of 40 μm (film obtained by corona-treating the sealant adhesive layer 16 side surface of a non-oriented polypropylene film manufactured by Mitsui Chemicals Tohcello. Inc. with a trade name of GHC,) to serve as the sealant layer 17 was adhered (thermocompression bonded) to the anticorrosion treatment layer 15 via the sealant adhesive layer 16 by sandwich lamination. Thus, a power storage device packaging material 10 was prepared.

Example 2

In Example 2, except that the materials for forming the adhesion-enhancing treatment layer 12 were changed to materials below, a power storage device packaging material 10 was prepared similarly to Example 1. An adhesion-enhancing treatment layer 12 of Example 2 was formed by inline coating, in which the coating agent B to serve as the base material of an adhesion-enhancing treatment layer 12 was coated onto a surface of a base material layer 11 (nylon 6 film with a thickness of 25 μm fabricated by sequential biaxial stretching) so as to have a solid content of 0.1 g/m², followed by drying, thereby forming the adhesion-enhancing treatment layer 12 with a thickness of about 0.1 μm.

Example 3

In Example 3, except that the materials for forming the adhesion-enhancing treatment layer 12 were changed to materials below, a power storage device packaging material 10 was prepared similarly to Example 1. An adhesion-enhancing treatment layer 12 of Example 3 was formed by inline coating, in which the coating agent C to serve as the base material of the adhesion-enhancing treatment layer 12 was coated onto a surface of a base material layer 11 (nylon 6 film with a thickness of 25 μm fabricated by sequential biaxial stretching) so as to have a solid content of 0.1 g/m², followed by drying, thereby forming the adhesion-enhancing treatment layer 12 with a thickness of about 0.1 μm.

Example 4

In Example 4, except that the materials for forming the adhesion-enhancing treatment layer 12 were changed to materials below, a power storage device packaging material 10 was prepared similarly to Example 1. An adhesion-enhancing treatment layer 12 of Example 4 was formed by inline coating, in which the coating agent D to serve as the base material of an adhesion-enhancing treatment layer 12 was onto a surface of a base material layer 11 (nylon 6 film with a thickness of 25 μm fabricated by sequential biaxial stretching) so as to have a solid content of 0.1 g/m², followed by drying, thereby forming the adhesion-enhancing treatment layer 12 with a thickness of about 0.1 μm.

Example 5

In Example 5, except that the base material layer 11 was changed to a film below, a power storage device packaging material 10 was prepared similarly to Example 1. In Example 5, as a base material layer 11, a nylon 6 film with a thickness of 25 μm fabricated by tubular biaxial stretching was used.

Example 6

In Example 6, except that the materials for forming the adhesion-enhancing treatment layer 12 were changed to materials below, a power storage device packaging material 10 was prepared similarly to Example 5. An adhesion-enhancing treatment layer 12 of Example 6 was formed by inline coating, in which the coating agent B to serve as the base material of an adhesion-enhancing treatment layer 12 was coated onto a surface of a base material layer 11 (nylon 6 film with a thickness of 25 μm fabricated by tubular biaxial stretching) so as to have a solid content of 0.1 g/m², followed by drying, thereby forming the adhesion-enhancing treatment layer 12 with a thickness of about 0.1 μm.

Example 7

In Example 7, except that the materials for forming the adhesion-enhancing treatment layer 12 were changed to materials below, a power storage device packaging material 10 was prepared similarly to Example 5. An adhesion-enhancing treatment layer 12 of Example 7 was formed by inline coating, in which the coating agent C to serve as the base material of an adhesion-enhancing treatment layer 12 was coated onto a surface of a base material layer 11 (nylon 6 film with a thickness of 25 μm fabricated by tubular biaxial stretching) so as to have a solid content of 0.1 g/m², followed by drying, thereby forming the adhesion-enhancing treatment layer 12 with a thickness of about 0.1 μm.

Example 8

In Example 8, except that the materials for forming the adhesion-enhancing treatment layer 12 were changed to materials below, a power storage device packaging material 10 was prepared similarly to Example 5. An adhesion-enhancing treatment layer 12 of Example 8 was formed by inline coating, in which the coating agent D to serve as the base material of the adhesion-enhancing treatment layer 12 was coated onto a surface of a base material layer 11 (nylon 6 film with a thickness of 25 μm fabricated by tubular biaxial stretching) so as to have a solid content of 0.1 g/m², followed by drying, thereby forming the adhesion-enhancing treatment layer 12 with a thickness of about 0.1 μm.

Comparative Example 1

In Comparative Example 1, the adhesion-enhancing treatment layer 12 forming the power storage device packaging material 10 of Example 1 was not used, but instead, the surface on one side of a base material layer 11 adhered to an adhesive layer 13 was corona-treated. Except for this treatment, a power storage device packaging material 10 was prepared similarly to Example 1.

Comparative Example 2

In Comparative Example 2, except that the base material layer 11 was changed to a film below, a power storage device packaging material 10 was prepared similarly to Comparative Example 1. In Comparative Example 2, a nylon 6 film with a thickness of 25 μm fabricated by tubular biaxial stretching was used as a base material layer 11.

<Measurement of Breaking Strength and Elongation of Base Material Layer>

Breaking strength and elongation in the four directions (0° (MD), 45°, 90° (TD), 135°) were measured for the base material layers used in Examples 1 to 8 and Comparative Examples 1 and 2 by conducting a tensile test in compliance with JIS K7127 (test specimen shape: test specimen type 5 stipulated in JIS K7127; inter-chuck distance: 60 mm; tensile speed: 50 mm/min). For the tensile test, a universal tester (Type4443, manufactured by Instron Corporate) was used. Elongation was calculated by the following equation. The results are shown in Table 1.

Elongation (%)={(travel distance of chuck (mm) before breakage in tensile test×100)/40 (mm)}

<Evaluation of Forming Depth>

For the power storage device packaging materials 10 prepared in Examples 1 to 8 and Comparative Examples 1 and 2, the forming depth that enabled deep drawing was evaluated by a method below. First, the power storage device packaging material 10 was disposed in a molder so that the sealant layer 17 was on top. The forming depth of the molder was set to a range of 3.5 to 9 mm on a 0.5 mm basis, and the power storage device packaging material 10 was cold-formed under an environment of 23° C. room temperature and −35° C. dew point temperature. The punch mold used had a rectangular transverse section of 70 mm×80 mm, with a punch radius (RP) of 1.00 mm in the bottom surface, and with a punch corner radius (RCP) of 1.00 mm in the side. The die mold used a die had an opening top surface with a die radius (RD) of 1.00 mm. The presence/absence of breakage and pinholes in cold-formed area was visually observed with light being applied to the packaging material 10, and a maximum value of the forming depth that enabled deep drawing with neither breakage nor pinholes was calculated. The results are shown in Table 1.

TABLE 1

| | Breaking strength of the base material layer (MPa) | | | | Elongation of the base material layer (%) | | | | Adhesion-enhancing treatment | Forming depth (mm) |
|---|---|---|---|---|---|---|---|---|---|---|
| | 0° | 45° | 90° | 135° | 0° | 45° | 90° | 135° | | |
| Example 1 | 179 | 289 | 279 | 205 | 98 | 92 | 78 | 109 | Coating agent A | 7.5 |
| Example 2 | 182 | 281 | 280 | 195 | 93 | 79 | 79 | 102 | Coating agent B | 7.5 |
| Example 3 | 188 | 261 | 255 | 191 | 95 | 78 | 70 | 100 | Coating agent C | 7.5 |
| Example 4 | 194 | 260 | 252 | 187 | 109 | 77 | 69 | 95 | Coating agent D | 7.5 |

TABLE 1-continued

|  | Breaking strength of the base material layer (MPa) | | | | Elongation of the base material layer (%) | | | | Adhesion-enhancing treatment | Forming depth (mm) |
| --- | --- | --- | --- | --- | --- | --- | --- | --- | --- | --- |
|  | 0° | 45° | 90° | 135° | 0° | 45° | 90° | 135° | | |
| Example 5 | 239 | 256 | 268 | 260 | 101 | 91 | 83 | 100 | Coating agent A | 8.5 |
| Example 6 | 242 | 255 | 259 | 258 | 102 | 93 | 83 | 99 | Coating agent B | 8.5 |
| Example 7 | 221 | 255 | 254 | 232 | 94 | 91 | 83 | 88 | Coating agent C | 8.5 |
| Example 8 | 239 | 258 | 249 | 241 | 98 | 92 | 81 | 92 | Coating agent D | 8.5 |
| Comparative example 1 | 199 | 259 | 257 | 186 | 111 | 77 | 70 | 94 | Corona treatment | 6.5 |
| Comparative example 2 | 230 | 261 | 272 | 253 | 99 | 91 | 85 | 98 | Corona treatment | 7.0 |

As is apparent from the results shown in Table 1, formability was confirmed to be improved by forming the adhesion-enhancing treatment layer 12 on the surface of the base material layer 11, compared to the case of giving adhesion-enhancing treatment to the base material layer 11 by corona treatment without forming the adhesion-enhancing treatment layer 12.

Example 9

In Example 9, except that the base material layer 11 was changed to a film below, a power storage device packaging material 10 was prepared similarly to Example 1. In Example 9, a nylon 6 film with a thickness of 15 µm fabricated by sequential biaxial stretching was used as a base material layer 11.

Example 10

In Example 10, except that the base material layer 11 was changed to a film below, a power storage device packaging material 10 was prepared similarly to Example 1. In Example 10, a nylon 6 film with a thickness of 15 µm fabricated by tubular biaxial stretching was used as a base material layer 11.

Comparative Example 3

In Comparative Example 3, the adhesion-enhancing treatment layer 12 forming the power storage device packaging material 10 of Example 9 was not used, but, instead of the adhesion-enhancing treatment, the surface on one side of a base material layer 11 adhered to an adhesive layer 13 was corona-treated. Except for this treatment, a power storage device packaging material 10 was prepared similarly to Example 9.

Comparative Example 4

In Comparative Example 4, except that the base material layer 11 was changed to a film below, a power storage device packaging material 10 was prepared similarly to Comparative Example 3. In Comparative Example 4, a nylon 6 film with a thickness of 15 µm fabricated by tubular biaxial stretching was used as a base material layer 11.

<Measurement of Breaking Strength and Elongation of Base Material Layer>

For the base material layers used in Examples 9 to 10 and Comparative Examples 3 and 4, breaking strength and elongation in four directions were measured by a method similar to the test method of Example 1 and other examples. The results are shown in Table 2.

<Evaluation of Forming Depth>

For the power storage device packaging materials 10 prepared in Examples 9 to 10 and Comparative Examples 3 and 4, the forming depth enabling deep drawing was evaluated by a method similar to the test method of Example 1 and other examples. The results are shown in Table 2.

TABLE 2

|  | Breaking strength of the base material layer (MPa) | | | | Elongation of the base material layer (%) | | | | Adhesion-enhancing treatment | Forming depth (mm) |
| --- | --- | --- | --- | --- | --- | --- | --- | --- | --- | --- |
|  | 0° | 45° | 90° | 135° | 0° | 45° | 90° | 135° | | |
| Example 9 | 180 | 258 | 253 | 191 | 81 | 59 | 92 | 73 | Coating agent A | 5.5 |
| Example 10 | 275 | 245 | 224 | 228 | 93 | 95 | 82 | 79 | Coating agent A | 6.0 |
| Comparative example 3 | 182 | 260 | 248 | 193 | 78 | 60 | 60 | 92 | Corona treatment | 4.5 |
| Comparative example 4 | 268 | 245 | 240 | 232 | 89 | 92 | 86 | 82 | Corona treatment | 5.0 |

As is apparent from the results shown in Table 2, even when the thickness of the base material layer 11 was reduced, formability was confirmed to be improved by forming the adhesion-enhancing treatment layer 12 on the surface of the base material layer 11, compared with the case of performing adhesion-enhancing treatment on the base material layer 11 by corona treatment without forming the adhesion-enhancing treatment layer 12.

Example 11

In Example 11, except that the base material layer 11 was changed to a film below, a power storage device packaging material 10 was prepared similarly to Example 1. In Example 11, a nylon 6 film with a thickness of 12 µm fabricated by sequential biaxial stretching was used as a base material layer 11.

Example 12

In Example 12, except that the base material layer 11 was changed to a film below, a power storage device packaging material 10 was prepared similarly to Example 1. In Example 12, a nylon 6 film with a thickness of 12 μm fabricated by tubular biaxial stretching was used as a base material layer 11.

Comparative Example 5

In Comparative Example 5, the adhesion-enhancing treatment layer 12 forming the power storage device packaging material 10 of Example 11 was not used, but, instead of the adhesion-enhancing treatment, the surface on one side of a base material layer 11 adhered to an adhesive layer 13 was corona-treated. Except for this treatment, a power storage device packaging material 10 was prepared similarly to Example 11.

Comparative Example 6

In Comparative Example 6, except that the base material layer 11 was changed to a film below, a power storage device packaging material 10 was prepared similarly to Comparative Example 5. In Comparative Example 6, a nylon 6 film with a thickness of 12 μm fabricated by tubular biaxial stretching was used as a base material layer 11.

<Measurement of Breaking Strength and Elongation of Base Material Layer>

For the base material layers used in Examples 11 and 12 and Comparative Examples 5 and 6, breaking strength and elongation in four directions were measured by a method similar to the test method of Example 1 and other examples. The results are shown in Table 3.

<Evaluation of Forming Depth>

For the power storage device packaging materials 10 prepared in Examples 11 and 12 and Comparative Examples 5 and 6, the forming depth enabling deep drawing was evaluated by a method similar to the test method of Example 1 and other examples. The results are shown in Table 3.

TABLE 3

| | Breaking strength of the base material layer (MPa) | | | | Elongation of the base material layer (%) | | | | Adhesion-enhancing treatment | Forming depth (mm) |
|---|---|---|---|---|---|---|---|---|---|---|
| | 0° | 45° | 90° | 135° | 0° | 45° | 90° | 135° | | |
| Example 11 | 179 | 259 | 250 | 185 | 81 | 58 | 63 | 72 | Coating agent A | 4.5 |
| Example 12 | 270 | 245 | 222 | 224 | 90 | 94 | 79 | 79 | Coating agent A | 5.0 |
| Comparative example 5 | 178 | 256 | 250 | 188 | 82 | 58 | 61 | 80 | Corona treatment | 3.5 |
| Comparative example 6 | 266 | 244 | 231 | 228 | 87 | 86 | 82 | 81 | Corona treatment | 4.0 |

As is apparent from the results shown in Table 3, even when the thickness of the base material layer 11 was further reduced, formability was confirmed to be improved by forming the adhesion-enhancing treatment layer 12 on the surface of the base material layer 11, compared with the case of giving adhesion-enhancing treatment to the base material layer 11 by corona treatment without forming the adhesion-enhancing treatment layer 12.

REFERENCE SIGNS LIST

1 . . . Battery element
2 . . . Lead
10, 20 . . . Packaging material (power storage device packaging material)
11 . . . Base material layer
12 . . . Adhesion-enhancing treatment layer
13 . . . Adhesive layer
14 . . . Metal foil layer
15 . . . Anticorrosion treatment layer
16 . . . Sealant adhesive layer
17 . . . Sealant layer
18 . . . Base material protective layer
30 . . . Embossed packaging material
32 . . . Shaped area (recess)
34 . . . Cover portion
40 . . . Secondary battery

What is claimed is:

1. A power storage device packaging material comprising a base material layer, an adhesion-enhancing treatment layer directly on a surface of the base material layer, an adhesive layer directly on a surface on one side of the adhesion-enhancing treatment layer opposite to the base material layer so that the adhesion-enhancement treatment layer is between the base material layer and the adhesive layer, a metal foil layer formed on a surface on one side of the adhesive layer opposite to the adhesion-enhancing treatment layer, and a sealant layer disposed on a surface on one side of the metal foil layer opposite to the adhesive layer, wherein:
the base material layer is formed of a biaxially oriented film to have a breaking strength of 240 MPa or more in at least one of four directions (0° (MD), 45°, 90° (TD), 135°) and an elongation of 80% or more in at least one direction in a tensile test for a test specimen having a shape given by test specimen 5 in JIS K7127 with an inter-chuck distance of 60 mm and a tensile speed of 50 mm/min, the adhesion-enhancing treatment layer comprises a) at least one resin selected from the group consisting of a polyester resin, acrylic resin, polyurethane resin, epoxy resin and acrylic graft polyester resin and b) silica particles, and wherein the adhesive layer comprises a polyurethane resin and does not contain silica.

2. The power storage device packaging material of claim 1, wherein the base material layer has a breaking strength of less than 240 MPa in at least one of the four directions in the tensile test.

3. The power storage device packaging material of claim 1, wherein the base material layer is a biaxially-oriented polyester film or a biaxially-oriented polyamide film.

4. The power storage device packaging material of claim 1, further comprising a base material protective layer formed on a surface on one side of the base material layer opposite to the adhesion-enhancing treatment layer.

5. The power storage device packaging material of claim 1, wherein the base material layer has a thickness in a range of 6 to 40 µm.

6. The power storage device packaging material of claim 1, wherein the adhesion-enhancing treatment layer has a thickness in a range of 0.02 to 0.5 µm.

7. The power storage device packaging material of claim 1, wherein the adhesive layer contains a pigment.

8. A power storage device comprising a battery element including an electrode, a lead extending from the electrode, and a container accommodating the battery element, wherein:
the container is formed from the power storage device packaging material of claim 1 so that the sealant layer is located on an inner side.

9. The power storage device packaging material of claim 1, wherein the base material layer is a biaxially-oriented polyester film or a biaxially-oriented polyamide film, the base material layer has a thickness in a range of 6 to 40 µm, and the adhesion-enhancing treatment layer has a thickness in a range of 0.02 to 0.5 µm.

10. The power storage device packaging material of claim 9, further comprising a base material protective layer formed on a surface on one side of the base material layer opposite to the adhesion-enhancing treatment layer, wherein the base material protective layer comprises an oriented polyester film.

11. The power storage device packaging material of claim 10, wherein the base material protective layer comprises a biaxially-oriented polyethylene terephthalate.

12. The power storage device packaging material of claim 9, wherein the base material layer has an elongation of 80% or more in all of the four directions (0° (MD), 45°, 90° (TD),135°).

13. The power storage device packaging material of claim 9, wherein the base material layer has a breaking strength of 250 MPa or more in at least one of the four directions.

14. The power storage device packaging material of claim 9, wherein the adhesion-enhancing treatment layer comprises a polyester resin and silica particles.

15. The power storage device packaging material of claim 9, wherein the adhesion-enhancing treatment layer comprises an acrylic resin and silica particles.

16. The power storage device packaging material of claim 9, wherein the adhesion-enhancing treatment layer comprises a polyurethane resin and colloidal silica.

* * * * *